US006664366B2

(12) United States Patent
Silva et al.

(10) Patent No.: US 6,664,366 B2
(45) Date of Patent: Dec. 16, 2003

(54) THERMALLY STABLE POLYMERS, METHOD OF PREPARATION, AND ARTICLES MADE THEREFROM

(75) Inventors: James Manio Silva, Clifton Park, NY (US); David Michel Dardaris, Ballston Spa, NY (US); Gregory Allen O'Neil, Clifton Park, NY (US); Joseph Anthony Suriano, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 68 days.

(21) Appl. No.: 10/105,563

(22) Filed: Mar. 25, 2002

(65) Prior Publication Data

US 2002/0156229 A1 Oct. 24, 2002

Related U.S. Application Data

(63) Continuation-in-part of application No. 09/966,127, filed on Sep. 28, 2001, now Pat. No. 6,596,843, which is a continuation-in-part of application No. 09/368,706, filed on Aug. 5, 1999, now Pat. No. 6,306,507.
(60) Provisional application No. 60/134,692, filed on May 18, 1999.

(51) Int. Cl.$^7$ .......................... C08F 6/12; C08G 63/12; C08G 63/16; C08L 67/02
(52) U.S. Cl. ................ 528/486; 528/489; 528/490; 528/497; 528/499; 528/194; 528/176; 528/302; 528/308.6; 528/104; 525/165; 525/58; 525/133; 525/191; 428/423.7; 428/35.8; 428/35.9
(58) Field of Search .................... 528/486, 489, 528/490, 497, 499, 194, 176, 302, 308.6, 104; 525/165, 58, 133, 191; 428/423.7, 35.8, 35.9

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,207,814 A | 9/1965 | Goldberg |
| 3,444,129 A | 5/1969 | Young, Jr. et al. |
| 3,460,961 A | 8/1969 | Young et al. |
| 3,939,117 A | 2/1976 | Ueno |
| 4,127,560 A | 11/1978 | Kramer |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,281,099 A | 7/1981 | Maresca |
| 4,286,083 A | 8/1981 | Kochanowski |
| 4,334,053 A | 6/1982 | Freitag et al. |
| 4,454,275 A | 6/1984 | Rosenquist |
| 4,482,694 A | 11/1984 | Freitag et al. |
| 4,487,896 A | 12/1984 | Mark et al. |
| 4,495,325 A | 1/1985 | DeBergalis et al. |
| 4,503,121 A | 3/1985 | Robeson et al. |
| 4,506,065 A | 3/1985 | Miller et al. |
| 4,576,842 A | 3/1986 | Hartsing et al. |
| 4,617,368 A | 10/1986 | Freitag et al. |
| 4,643,937 A | 2/1987 | Dickinson et al. |
| 4,931,364 A | 6/1990 | Dickinson |
| 4,948,864 A | 8/1990 | Imai et al. |
| 4,973,652 A | 11/1990 | Ebert et al. |
| 4,992,322 A | 2/1991 | Curry et al. |
| 5,030,505 A | 7/1991 | Dickinson |
| 5,036,150 A | 7/1991 | Kawakami et al. |
| 5,064,704 A | 11/1991 | Stewart |
| 5,321,114 A | 6/1994 | Fontana et al. |
| 5,714,567 A | 2/1998 | Idage et al. |
| 5,807,965 A | 9/1998 | Davis |
| 5,916,997 A | 6/1999 | Webb et al. |
| 6,265,522 B1 * | 7/2001 | Brunelle et al. |
| 6,291,589 B1 * | 9/2001 | Brunelle et al. |
| 6,294,647 B1 | 9/2001 | Brunelle et al. |
| 6,306,507 B1 * | 10/2001 | Brunelle et al. |
| 6,307,005 B1 | 10/2001 | Davis et al. |
| 6,538,065 B1 * | 3/2003 | Suriano et al. |
| 6,596,843 B2 * | 7/2003 | Brunelle et al. |

FOREIGN PATENT DOCUMENTS

| | | |
|---|---|---|
| DE | 1927938 | 12/1970 |
| JP | 56/133332 | 10/1981 |
| JP | 1/199841 | 8/1989 |
| JP | 1/201326 | 8/1989 |
| JP | 06 122756 | 5/1994 |
| WO | WO 00/26275 | 5/2000 |

OTHER PUBLICATIONS

Eareckson, Journal of Polymer Science, vol. XL, pp. 399–406 (1959).
Cohen, et al, Journal of Polymer Science: Part A–1, vol. 9, 3263–3299 (1971).

* cited by examiner

*Primary Examiner*—Duc Truong
(74) *Attorney, Agent, or Firm*—Andrew J. Caruso; Patrick K. Patnode

(57) ABSTRACT

Thermally stable polymers comprising chain members derived from at least one 1,3-dihydroxybenzene moiety and at least one aromatic dicarboxylic acid moiety, said polymer being substantially free of anhydride linkages linking at least two mers of the polymer chain, are prepared using an interfacial method comprising the steps of: (a) combining at least one 1,3-dihydroxybenzene moiety and at least one catalyst in a mixture of water and at least one organic solvent substantially immiscible with water; (b) adding to the mixture from (a) a controlled stoichiometric ratio of at least one acid chloride and at least one base while maintaining the pH between about 4 and about 8.5, and (c) adjusting the pH of the reaction mixture to a value in the range of about 7 and about 9 following complete addition of acid chloride, and stirring the reaction mixture for a time sufficient to destroy any anhydride linkages in the polymer chain.

118 Claims, No Drawings

THERMALLY STABLE POLYMERS, METHOD OF PREPARATION, AND ARTICLES MADE THEREFROM

CROSS-REFERENCE TO RELATED APPLICATION

This application is a continuation-in-part of copending U.S. application Ser. No. 09/966,127, filed Jul. 28, 2001 now U.S. Pat. No. 6,596,843, which is a continuation-in-part of U.S. application Ser. No. 09/368,706, filed Aug. 5, 1999, now U.S. Pat. No. 6,306,507, which claims the benefit of U.S. Provisional Application No. 60/134,692, filed May 18, 1999, and which applications are incorporated herein by reference.

BACKGROUND OF THE INVENTION

This invention relates to thermally stable polymers comprising polyester chain members derived from at least one 1,3-dihydroxybenzene moiety and at least one aromatic dicarboxylic acid moiety (often referred to hereinafter as resorcinol arylate chain members), a method for their preparation, and multilayer articles made therefrom.

Various resinous articles comprising polymers have a problem of long term color instability. In many cases this instability is seen as yellowing of the polymer, detracting from the article's attractiveness and also transparency when the polymer was initially transparent. Loss of gloss can also be an undesirable long term phenomenon in a resinous article.

Yellowing of polymers is often caused by the action of ultraviolet radiation, and such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds, which must be employed at relatively low levels, typically up to 1% by weight, to avoid degradation of the physical properties of the polymer such as impact strength and high temperature properties as reflected in heat distortion temperature. Another problem of concern with polymers such as aromatic polycarbonates and addition polymers of alkenylaromatic compounds such as styrene is susceptibility to attack by organic liquids.

One way of protecting a resinous article against photoyellowing and loss of gloss is to apply a coating of a weatherable second polymer, the term "weatherable" as used herein signifying resistance to such phenomena. Coatings made from polyesters containing resorcinol arylate chain members often possess good weatherability properties. The arylate moieties typically contain isophthalate, terephthalate, and especially mixtures of iso- and terephthalate units. Polyesters of resorcinol with mixtures of isophthalate and terephthalate chain members typically have good weatherability properties and may provide protection against photoyellowing when coated over a resinous substrate.

The good weatherability properties of polyesters containing resorcinol arylate units are believed to arise in large part from the screening effect said polymers may provide to ultraviolet (UV) light. On exposure to UV light polymers comprising resorcinol arylate chain members may undergo photochemical Fries rearrangement converting at least a portion of the polymer from polyester chain members to o-hydroxybenzophenone-type chain members. The o-hydroxybenzophenone-type chain members act to screen further UV light and protect UV-sensitive components in a resorcinol arylate-containing composition. The good weatherability properties of polymers comprising resorcinol arylate chain members make them especially useful in blends and in multilayer articles in which said polymers may act as a protecting layer for more sensitive substrate components.

Copolyesters comprising resorcinol iso- and terephthalate polyester chain members in combination with diacid or diol alkylene chain members (so-called "soft-block" chain members) are disclosed in commonly owned U.S. Pat. No. 5,916,997. These copolymers have excellent weatherability and flexibility. Copolyestercarbonates comprising resorcinol iso- and terephthalate polyester chain members in combination with carbonate chain members are disclosed in published PCT Application WO 00/26275. These copolymers have excellent weatherability and are compatible with polycarbonates in blends.

Polyesters containing resorcinol arylate chain members have been prepared by melt methods as disclosed in U.S. Pat. No. 4,127,560 and in Japanese Kokai 1/201,326. The methods may provide polyesters containing isophthalate and terephthalate chain members but do not allow the incorporation of greater than 30 mole % terephthalate. In addition, the polyesters obtained have unacceptable color.

Polyesters containing resorcinol arylate chain members have also been prepared by an interfacial method. The interfacial method comprises a solvent mixture containing water and at least one organic solvent substantially immiscible with water. According to U.S. Pat. No. 3,460,961 and Eareckson, Journal of Polymer Science, vol. XL, pp. 399–406 (1959), preparation of resorcinol arylate polyesters with a mixture of iso- and terephthalate chain members is performed by an interfacial method in water and a water-immiscible solvent such as chloroform or dichloromethane using 1:1 stoichiometric ratio of resorcinol to either iso- or terephthaloyl dichloride, or a mixture thereof, in the presence of aqueous sodium hydroxide. The resorcinol is combined with the aqueous sodium hydroxide before addition of acid chlorides, and the reaction is run at pH which is initially high but which decreases as the reaction proceeds. The molecular weight of the polymers is not controlled. The method provides polymer with very high weight average molecular weight (Mw), making the polymer unsuitable for some applications. Furthermore, the polymer has poor thermal stability and loses molecular weight upon thermal treatment.

Multilayer articles containing layers made from resorcinol arylate-containing polyester have been described by Cohen et al., Journal of Polymer Science: Part A-1, vol. 9, 3263–3299 (1971) and in U.S. Pat. No. 3,460,961. The polyester was made either in solution or by an interfacial process. The solution method requires the use of a stoichiometric amount of an organic base, such as a tertiary amine, which must be isolated and recovered for reuse in any economical, environmentally friendly process. Both methods produce thermally unstable polyester which can only be applied by solution coating followed by evaporation of the solvent to make a multilayer article. This solution coating method has numerous deficiencies, some of which are mentioned in the Cohen et al. paper at page 3267: namely, the necessity to use high priced and toxic solvents, the inherently low concentration of the arylate polymer in the solvent and the tendency of the solutions to gel. Accordingly, the described polyesters were considered "unacceptable coating candidates".

Japanese Kokai 1/199,841 discloses articles having a substrate layer comprising at least 90 mole percent poly (ethylene terephthalate) and a gas barrier coating layer which is a polyester of resorcinol and a minimum of 50 mole % isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding. However, the only types of articles disclosed are bottles, which are produced from a co-injection molded parison by subsequent blow molding. Larger articles, such as external automobile body parts, are not disclosed and no method for their production is suggested, nor are articles in which the substrate layer is anything other than poly (ethylene terephthalate). In addition, the resorcinol isophthalate polyesters were prepared either by melt methods which do not allow the incorporation of greater than 30 mole % terephthalate and give polyester with unacceptable color, or by the interfacial method which produces thermally unstable polyester.

For some applications it is desired to produce a polyester comprising resorcinol arylate chain members and containing some maximum number of phenolic end-groups accompanied by a minimum number of carboxylic acid end-groups for a given molecular weight polyester. Block copolyestercarbonates of published PCT Application WO 00/26275 are prepared in one embodiment by a method which comprises the steps of: (A) preparing a hydroxy-terminated polyester intermediate having a degree of polymerization of at least 4 by the reaction of at least one 1,3-dihydroxybenzene moiety with at least one aromatic dicarboxylic acid dichloride; and (B) conducting a reaction of said polyester intermediate with a carbonate precursor. The polyester intermediate is synthesized by an interfacial method employing in one embodiment unsubstituted resorcinol, isophthaloyl dichloride, terephthaloyl dichloride, water and dichloromethane, which is often the organic solvent of choice. The hydroxy-terminated polyester intermediate comprises phenolic hydroxy end-groups suitable for growing polycarbonate chains in a subsequent reaction step with a carbonate precursor, and optional second dihydroxy-containing compound. However, formation of hydroxy terminated, low molecular weight resorcinol arylate polyester oligomers is difficult when typical procedures are followed. This is believed to be due to high water solubility and very low dichloromethane solubility of resorcinol as compared to other dihydric phenol monomers. Conventional methods of producing resorcinol arylate polyester oligomers lead to very high molecular weight polyesters, even when a large excess of resorcinol is employed. Also, carboxylic acid end-groups may arise for example through hydrolysis of acid chloride end-groups. In addition such polyesters typically exhibit thermal instability, which is believed to be due to the presence of anhydride linkages in the polyester chains.

Control of oligomer molecular weight and polymer terminal groups in resorcinol arylate polyester oligomers can be achieved to some extent by the use of phase transfer catalysts, as disclosed in commonly owned U.S. Pat. No. 6,306,507. Unfortunately, several issues with the use of phase transfer catalysts in large scale operations exist. Emulsions can be encountered during work-up and washing steps using centrifugal separators, and the presence of phase transfer catalysts can accelerate polymer hydrolysis during work-up or cause problems with recycle brine streams. Thus, it would be desirable to obtain hydroxy-terminated, thermally stable, low molecular weight polyester oligomers comprising 1,3-dihydroxybenzene moieties via an alternative process.

Japanese Kokai 56/133,332 describes copolyestercarbonates "having a highly alternating orientation" but without a block structure. They are prepared by a 2-step process in which the first step is preparation of a hydroxy-terminated polyester oligomer having a degree of polymerization of only 1 to 2 and made by an interfacial process in the presence of dichloromethane. The second step is treatment of said oligomer in an interfacial process with a carbonate precursor such as phosgene to afford a final product having essentially alternating polyester and polycarbonate linkages; i.e., the degree of polymerization of the carbonate blocks is also about 1 to 2. No details of the weatherability of these copolyestercarbonates are provided.

It remains of interest, therefore, to develop a method for preparing weatherable, solvent resistant multilayer articles which are capable of use for such varied purposes as body parts for outdoor vehicles and devices such as automobiles. There is also a particular need for polymers comprising resorcinol arylate chain members having controlled molecular weight, high thermal stability, low color, and a desirable ratio of phenolic end-groups to carboxylic acid end-groups. There is also a particular need for polymers comprising resorcinol arylate chain members that can be processed using typical melt processing techniques.

BRIEF SUMMARY OF THE INVENTION

The present inventors have identified the primary source of poor thermal stability in polymers comprising resorcinol arylate polyester chain members prepared by the interfacial method, and have discovered a method to prepare said polymers in thermally stable form with controlled molecular weight. The new method also allows the preparation of virtually colorless polymers comprising resorcinol arylate polyester chain members. The new method also allows the preparation of resorcinol arylate polyesters with a high concentration of phenolic end-groups while minimizing carboxylic acid end-groups.

In one of its aspects the present invention provides an interfacial method for preparing polymers comprising chain members derived from at least one 1,3-dihydroxybenzene moiety and at least one aromatic dicarboxylic acid moiety, said polymer being substantially free of anhydride linkages linking at least two mers of the polymer chain, comprising the steps of:

(a) combining at least one 1,3-dihydroxybenzene moiety and at least one catalyst in a mixture of water and at least one organic solvent substantially immiscible with water;

(b) adding to the mixture from (a) a controlled stoichiometric ratio of at least one acid chloride and at least one base while maintaining the pH between about 4 and about 8.5, and (c) adjusting the pH of the reaction mixture to a value in the range of about 7 and about 9 following complete addition of acid chloride, and stirring the reaction mixture for a time sufficient to destroy any anhydride linkages in the polymer chain.

In another of its aspects the invention provides an interfacial method for preparing a polymer consisting essentially of chain members derived from a mixture of eterephthaloyl dichloride and isophthaloyl dichloride in a molar ratio in a range of about 0.4–2.5:1 and unsubstituted resorcinol, said polymer being substantially free of anhydride linkages linking at least two mers of the polymer chain.

In yet another of its aspects the invention provides an interfacial method for preparing a copolymer comprising $C_{3-20}$ straight chain alkylene, $C_{3-10}$ branched alkylene, or $C_{4-10}$ cyclo- or bicyclo-alkylene chain members derived from at least one dicarboxylic acid dichloride, in combination with chain members derived from at least one aromatic dicarboxylic acid dichloride and unsubstituted resorcinol, said polymer being substantially free of anhydride linkages linking at least two mers of the polymer chain.

In still another of its aspects the invention provides an interfacial method for preparing a block copolyestercarbonate comprising polyester block segments with chain members derived from at least one 1,3-dihydroxybenzene moiety and at least one aromatic dicarboxylic acid moiety; and polycarbonate block segments; wherein said copolyestercarbonate is substantially free of anhydride linkages linking at least two mers of the polyester blocks.

In still another of its aspects the invention provides an interfacial method for preparing a block copolyestercarbonate comprising polyester block segments with chain members derived from a mixture of terephthaloyl dichloride and isophthaloyl dichloride in a molar ratio in a range of about 0.4–2.5:1 and unsubstituted resorcinol, and polycarbonate segments with chain members derived from at least one of unsubstituted resorcinol and bisphenol A; wherein said copolyestercarbonate is substantially free of anhydride linkages linking at least two mers of the polyester blocks.

DETAILED DESCRIPTION OF THE INVENTION

In one embodiment the present invention comprises an interfacial method for preparing thermally stable polymers comprising polyester chain members derived from at least one 1,3-dihydroxybenzene moiety and at least one aromatic dicarboxylic acid moiety, which polymers derive their thermal stability in large part from being substantially free of anhydride linkages in the polymer chains. In another embodiment the present invention comprises the thermally stable polymers prepared by such an interfacial method.

Thermal stability within the context of the present invention refers to resistance of a polymer to molecular weight degradation under thermal conditions. Thus, a polymer with poor thermal stability shows significant molecular weight degradation under thermal conditions, such as during extrusion, molding, thermoforming, hot-pressing, and like conditions. Molecular weight degradation may also be manifested through color formation and/or in the degradation of other properties such as weatherability, gloss, mechanical properties, and/or thermal properties. Molecular weight degradation can also cause significant variation in processing conditions as the melt viscosity of the polymer changes.

In one of its aspects the method of the present invention provides thermally stable polymers comprising arylate polyester chain members. Said chain members comprise at least one diphenol residue in combination with at least one aromatic dicarboxylic acid residue. In a particular embodiment the diphenol residue, illustrated in the structural moiety of Formula (I), is derived from a 1,3-dihydroxybenzene moiety, commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

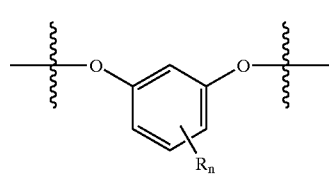

Formula (I)

In Formula (I) R is at least one of $C_{1-12}$ alkyl or halogen, and n is 0–3.

Suitable dicarboxylic acid residues include aromatic dicarboxylic acid residues derived from monocyclic moieties, including isophthalic acid, terephthalic acid, or mixtures of isophthalic and terephthalic acids, or from polycyclic moieties. In various embodiments the aromatic dicarboxylic acid residues are derived from mixtures of isophthalic and terephthalic acids as typically illustrated in the structural moiety of Formula (II).

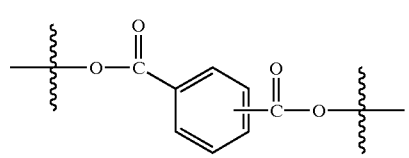

Formula (II)

Therefore, in one embodiment the present invention provides thermally stable polymers comprising resorcinol arylate polyester chain members as typically illustrated in the structural moiety of Formula (III) wherein R and n are as previously defined:

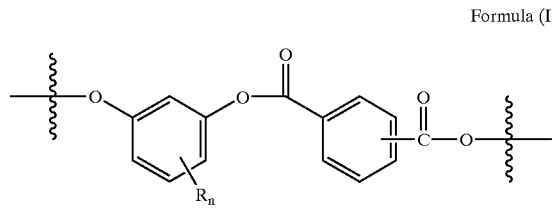

Formula (III)

Previous interfacial methods for preparing polyesters comprising resorcinol arylate chain members typically provide polymers with poor thermal stability and uncontrolled molecular weight. The present inventors have discovered that a primary reason for poor thermal stability is the presence of anhydride linkages in the backbone of the polyester chain. Typical anhydride linkages are illustrated in the structural moiety of Formula (IV), wherein R and n are as previously defined. Such anhydride linkages link at least two mers in a polymer chain and may arise through combination of two isophthalate or terephthalate moieties or mixtures thereof, although it is to be understood that anhydride linkages in polymers comprising resorcinol arylate chain members may arise through combination of any suitable similar dicarboxylic acid residues or mixtures of suitable dissimilar dicarboxylic acid residues present in a reaction mixture.

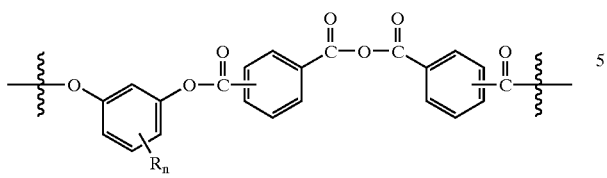

Formula (IV)

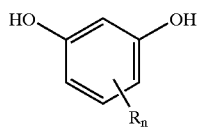

Formula (V)

wherein R is at least one of $C_{1-12}$ alkyl or halogen, and n is 0–3. Alkyl groups, if present, are in various embodiments straight-chain, branched or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, nonyl, decyl, dodecyl and aryl-substituted alkyl, including benzyl. In a particular embodiment a suitable alkyl group is methyl. Suitable halogen groups include bromo, chloro, and fluoro. 1,3-Dihydroxybenzene moieties containing a mixture of alkyl and halogen substituents are also suitable in some embodiments. The value for n may be in one embodiment in a range of between 0 and 3, in another embodiment in a range of between 0 and 2, and in still another embodiment in a range of between 0 and 1, inclusive. In one embodiment the resorcinol moiety is 2-methylresorcinol. In another embodiment the resorcinol moiety is an unsubstituted resorcinol moiety in which n is zero. Polymers are also contemplated which contain structural units derived from mixtures of 1,3-dihydroxybenzene moieties, such as a mixture of unsubstituted resorcinol and 2-methylresorcinol.

Although the invention is not limited by theory, it is believed that the anhydride linkage represents a weak bond in the polyester chain, which can break under thermal processing conditions to produce shorter chains terminated by acid end-groups. These acid end-groups, in turn, may accelerate the hydrolysis of the arylate moiety, generating additional carboxyl and hydroxyl end-groups, and further contributing to the molecular weight degradation, and loss in other desirable properties. Anhydride linkages may arise through several mechanisms. In one mechanism a carboxylicacid chloride may be hydrolyzed to carboxylic acid when the esterification reaction is run at high pH. The carboxylic acid or corresponding carboxylate may then react with another carboxylic acid chloride to yield an anhydride linkage.

Anhydride linkages may be detected by means known to those skilled in the art such as by $^{13}C$ nuclear magnetic resonance spectroscopy (NMR). For example, resorcinol arylate polyesters comprising dicarboxylic acid residues derived from a mixture of iso- and terephthalic acids typically show $^{13}C$ NMR resonances attributed to anhydride at 161.0 and 161.1 ppm (in deuterochloroform relative to tetramethylsilane), as well as resonances for the polymer carboxylic acid and hydroxyl end-groups. After thermal processing (for example, extrusion and/or molding), the polymer molecular weight decreases, and the anhydride resonances typically decrease, while those of the acid and hydroxyl end-groups typically increase.

Anhydride linkages in polymers comprising resorcinol arylate polyester chain members may also be detected by reaction of polymer with a nucleophile, such as a secondary amine. For example, resorcinol arylate polyesters comprising dicarboxylic acid residues derived from a mixture of iso- and terephthalic acids can be dissolved in a convenient solvent, such as dichloromethane, and treated with a secondary amine, such as dibutylamine or diisobutylamine, for several minutes at ambient temperature. Comparison of the starting polymer molecular weight to that after amine treatment typically shows a decrease in molecular weight which can be correlated with the corresponding decrease observed under typical thermal processing conditions. Although the invention is not meant to be limited by theory, it is believed that nucleophiles, such as secondary amine and phenolic, attack anhydride linkages (as opposed to ester linkages) selectively under the reaction conditions. The decrease in molecular weight upon reaction with amine nucleophile is therefore an indication of the presence of anhydride functionality in the polymer.

In one of its aspects the present invention provides an interfacial method for preparing polymers comprising resorcinol arylate polyester chain members substantially free of anhydride linkages, said method comprising a step of preparing a mixture comprising at least one resorcinol moiety, at least one catalyst and at least one organic solvent substantially immiscible with water. Suitable resorcinol moieties comprise units of Formula (V):

In one embodiment a resorcinol moiety is added to a reaction mixture as an aqueous solution, or mixture with water comprising at least some undissolved resorcinol moiety. In many circumstances aqueous solutions containing a resorcinol moiety such as unsubstituted resorcinol discolor with time. Although the invention is not dependent upon theory, it is believed that at least some color formation in solution may result from oxidation of resorcinol moiety species. When a discolored solution comprising resorcinol moiety is employed in synthesis of polymers of the present invention, the product polymers may be darker in color than desired, making said polymers unsuitable for use in many applications. It has been discovered that aqueous solutions and water mixtures comprising resorcinol moiety may be inhibited from discoloration by providing a pH in one embodiment of about 5 or less in the aqueous solution, in another embodiment of about 4 or less in the aqueous solution, and in still another embodiment of about 3 or less in the aqueous solution. In one embodiment when an aqueous solution comprising resorcinol moiety at a pH of about 5 or less is employed in synthesis of polymers of the present invention, the product polymers are typically lighter in color than corresponding polymers prepared using an aqueous solution comprising resorcinol moiety without added acid. In another embodiment when an aqueous solution comprising resorcinol moiety at a pH of about 5 or less is employed in synthesis of polymers of the present invention, the product polymers are typically lighter in color than corresponding polymers prepared using an aqueous solution comprising resorcinol moiety wherein the pH of the aqueous solution is greater than about 5. Color can be determined by visual observation or by other methods known to those skilled in the art, such as spectroscopic methods.

The amount of water present in a solution or mixture comprising water and at least one resorcinol moiety is in one embodiment in a range of between about 0.5 wt % and about 70 wt %, in another embodiment in a range of between about 0.5 wt % and about 30 wt %, in another embodiment in a range of between about 1 wt % and about 25 wt %, in another embodiment in a range of between about 2 wt % and about 20 wt %, and in still another embodiment in a range of between about 5 wt % and about 15 wt %. In one particular embodiment the amount of water present in a solution or mixture comprising water and at least one resorcinol moiety is in a range of between about 50 wt % and about 60 wt %.

The pH of about 5 or less may be provided in some embodiments using at least one inorganic acid or at least one organic acid, or at least one of an inorganic acid in combination with at least one of an organic acid. In various embodiments inorganic acids comprise hydrochloric acid, phosphoric acid, phosphorous acid, sulfuric acid, and mixtures thereof. In various embodiments organic acids comprise organic sulfonic acids, methanesulfonic acid, p-toluenesulfonic acid, sulfonic acid-functionalized ion exchange resins, organic carboxylic acids, lactic acid, malic acid, glyceric acid, oxalic acid, malonic acid, succinic acid, glutaric acid, adipic acid, citric acid, tartaric acid, glycolic acid, thioglycolic acid, tartronic acid, acetic acid, halogenated acetic acids, monochloroacetic acid, dichloroacetic acid, trichloroacetic acid, propionic acid, gluconic acid, ascorbic acid, and mixtures thereof. In some embodiments gluconic acid may be particularly beneficial because of its iron complexing ability and lack of corrosive properties compared to certain other acids.

In other embodiments an aqueous solution with a pH of 5 or less may be provided using a recycle water stream derived from washing an organic solution comprising a polymer with an aqueous solution comprising acid. In a particular embodiment the recycle water stream is derived from washing an organic solution comprising a condensation polymer and at least one salt, such as an alkali metal halide. In another particular embodiment the recycle water stream is derived from washing an organic solution comprising bisphenol A polycarbonate polymer with an aqueous acidic solution. In another particular embodiment the recycle water stream is derived from washing an organic solution comprising a resorcinol arylate-comprising polymer with an aqueous acidic solution. In another particular embodiment the recycle water stream is derived from washing an organic solution comprising a copolyestercarbonate comprising resorcinol arylate-structural units with an aqueous acidic solution. In various embodiments suitable recycle water streams may comprise at least one alkali metal halide, such as, but not limited to, sodium chloride, sodium fluoride, potassium chloride, or potassium fluoride. In other embodiments suitable recycle water streams may comprise at least one amine salt, such as a trialkylamine hydrochloride salt. In some embodiments amine salts are derived from trialkylamines described hereinbelow. In various embodiments suitable recycle water streams comprise both of at least one alkali metal halide and at least one amine salt. In particular embodiments suitable recycle water streams comprise triethylamine hydrochloride and sodium chloride. In other embodiments suitable recycle water streams may comprise at least one amine salt which is a quaternary ammonium salt, quaternary phosphonium salt, or guanidinium salt. In some embodiments suitable quaternary ammonium salts, quaternary phosphonium salts, or guanidinium salts are those described hereinbelow. An aqueous solution comprising resorcinol moiety in recycle water has in one embodiment a pH less than or equal to about 5, in another embodiment a pH less than or equal to about 4, in another embodiment a pH less than or equal to about 3, in another embodiment a pH in a range of between about 1 and about 3, in another embodiment a pH in a range of between about 1 and about 2, and in still another embodiment a pH in a range of between about 1 and about 1.6.

In embodiments wherein the recycle water stream comprises at least one member selected from the group consisting of an amine salt, a trialkylamine hydrochloride salt, a quaternary ammonium salt, a quaternary phosphonium salt, and a guanidinium salt, then in one embodiment the recycle water stream may serve as the source of at least a portion of the total amount of these species when said species or species derived therefrom are required as catalysts in the polymerization process. In other embodiments the recycle water stream may serve as the source of the total amount of these species when these species are required as catalysts. In a particular embodiment a recycle water stream is analyzed for the catalyst species present, and, if necessary, additional catalyst species may be added to the recycle water stream or the recycle water stream may be diluted with additional water to adjust the concentration of catalyst species so that the total amount of catalyst species added to the reaction mixture is derived from the recycle water without needing to add catalyst separately. In particular embodiments analysis and optional concentration adjustment are done before using the recycle water to prepare a solution comprising resorcinol moiety. Those skilled in the art will recognize that an aqueous composition comprising resorcinol moiety and components of a recycle water stream may be prepared and used in polymerization reactions even though said aqueous composition without resorcinol moiety was not actually used to wash an organic solution comprising a polymer.

Aqueous solutions comprising resorcinol moiety and acid or an acidic recycle water stream may be prepared before use and, if so desired, stored for a period of time. Said solutions may be at essentially room temperature or at a temperature above room temperature. In one embodiment solutions of a resorcinol moiety comprising water may be at a temperature above the melting point of the resorcinol moiety, for example at a temperature above the melting point of unsubstituted resorcinol.

In another embodiment a resorcinol moiety may be added to a reaction mixture in a molten state. In a particular embodiment said molten resorcinol moiety may comprise water. In another particular embodiment said molteirresorcinol moiety comprises water and at least one inorganic acid or at least one organic acid, or at least one of an inorganic acid in combination with at least one of an organic acid. In another particular embodiment said molten resorcinol moiety is essentially free of water and comprises at least one inorganic acid or at least one organic acid, or at least one of an inorganic acid in combination with at least one of an organic acid. Both types of acids may be selected from those disclosed hereinabove. In some embodiments organic acids may be selected due to their lower corrosive properties. In the present context essentially free of water means that no free water is intentionally added and the water present is that adventitiously obtained, for example through adsorption from the environment. In some embodiments essentially free of water means that the molten resorcinol moiety comprises less than about 0.5 wt % water. The amount of acid which may be present when resorcinol moiety is added to a reaction mixture in the molten state is an amount sufficient to retard color formation over any time period compared to a corresponding composition comprising resorcinol moiety without added acid. In various embodiments the amount of acid which may be present is in one embodiment in a range of between about 0.1 ppm and about 100,000 ppm, in another embodiment in a range of between about 1 ppm and about 10,000 ppm, in another embodiment in a range of between about 10 ppm and about 8,000 ppm, in another embodiment in a range of between about 50 ppm and about 4,000 ppm, and in still another embodiment in a range of between about 100 ppm and about 3,000 ppm.

The method for preparing polymers comprising resorcinol arylate polyester chain members further comprises combining at least one catalyst with the reaction mixture. Said catalyst may be present at a total level in one embodiment in a range of between about 0.1 and about 10 mole %, and in another embodiment in a range of between about 0.2 and about 6 mole % based on total molar amount of acid chloride groups. Suitable catalysts comprise tertiary amines, quaternary ammonium salts, quaternary phosphonium salts, guanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N—$C_1$–$C_6$-alkyl-pyrrolidines, such as N-ethylpyrrolidine, N—$C_1$–$C_6$-piperidines, such as N-ethylpiperidine, N-ethylpiperidine, and N-isopropylpiperidine, N—$C_1$–$C_6$-morpholines, such as N-ethylmorpholine and N-isopropyl-morpholine, N—$C_1$–$C_6$-dihydroindoles, N—$C_1$–$C_6$-dihydroisoindoles, N—$C_1$–$C_6$-tetrahydroquinolines, N—$C_1$–$C_6$-tetrahydroisoquinolines, N—$C_1$–$C_6$-benzomorpholines, 1-azabicyclo-[3.3.0]-octane, quinuclidine, N—$C_1$–$C_6$-alkyl-2-azabicyclo-[2.2.1]-octanes, N—$C_1$–$C_6$-alkyl-2-azabicyclo-[3.3.1]-nonanes, and N—$C_1$–$C_6$-alkyl-3-azabicyclo-[3.3.1]-nonanes, N,N,N',N'-tetraalkylalkylenediamines, including N,N,N',N'-tetraethyl-1,6-hexanediamine. In particular embodiments tertiary amines are triethylamine and N-ethylpiperidine.

When the catalyst comprises at least one tertiary amine, then said catalyst may be present at a total level in one embodiment in a range of between about 0.1 and about 10 mole %, in another embodiment in a range of between about 0.2 and about 6 mole %, in another embodiment in a range of between about 1 and about 4 mole %, and in still another embodiment in a range of between about 2 and about 4 mole % based on total molar amount of acid chloride groups. In another particular embodiment a tertiary amine may be present at a total level in a range of between about 0.5 and about 2 mole % based on total molar amount of acid chloride groups. In one embodiment of the invention all of the at least one tertiary amine is present at the beginning of the reaction before addition of acid chloride to resorcinol moiety. In another embodiment a portion of any tertiary amine is present at the beginning of the reaction and a portion is added following or during addition of acid chloride to resorcinol moiety. In this latter embodiment the amount of any tertiary amine initially present with resorcinol moiety may range in one embodiment from about 0.005 wt. % to about 10 wt. %, in another embodiment from about 0.01 to about 1 wt. %, and in still another embodiment from about 0.02 to about 0.3 wt. % based on total amine.

Suitable quaternary ammonium salts and quaternary phosphonium salts include quaternary ammonium and quaternary phosphonium halides, illustrative examples of which include, but are not limited to, tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amine-ammonium salts such as disclosed in U.S. Pat. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide. Suitable guanidinium salts include, but are not limited to, hexaalkylguanidinium salts and alpha,omega-bis(pentaalkylguanidinium)alkane salts, comprising hexaalkylguanidinium halides, alpha, omega-bis(pentaalkylguanidinium)alkane halides, hexaethylguanidinium halides, and hexaethylguanidinium chloride.

Organic solvents substantially immiscible with water suitable for use in preparing polymers comprising resorcinol arylate polyester chain members include those which are in one embodiment less than about 5 wt. % soluble in water, and in another embodiment less than about 2 wt. % soluble in water under the reaction conditions. Suitable organic solvents include dichloromethane, trichloroethylene, tetrachloroethane, chloroform, 1,2-dichloroethane, toluene, xylene, trimethylbenzene, chlorobenzene, o-dichlorobenzene, and mixtures thereof. In particular embodiments water-immiscible solvents are chlorinated aliphatic compounds such as dichloromethane.

In one embodiment the present invention provides an interfacial method for preparing polymers comprising resorcinol arylate polyester chain members substantially free of anhydride linkages, said method comprising steps of preparing a mixture comprising at least one resorcinol moiety, at least one catalyst and at least one organic solvent substantially immiscible with water; and adding to the mixture at least one acid chloride while maintaining the pH between about 4 and about 8.5, wherein the total molar amount of acid chloride groups is stoichiometrically deficient relative to the total molar amount of phenolic groups. In another embodiment the present invention provides an interfacial method for preparing polymers comprising resorcinol arylate polyester chain members substantially free of anhydride linkages, said method comprising steps of preparing a mixture comprising at least one resorcinol moiety, at least one catalyst and at least one organic solvent substantially immiscible with water; and adding to the mixture at least one acid chloride and a base in some specific stoichiometric ratio of base to acid chloride that may or may not vary with time and at specific rates that may or may not vary with time, wherein the total molar amount of acid chloride groups is stoichiometrically deficient relative to the total molar amount of phenolic groups.

Suitable acid chlorides comprise dicarboxylic acid dichlorides which comprise aromatic dicarboxylic acid dichlorides comprising monocyclic moieties, including isophthaloyl dichloride, terephthaloyl dichloride, or mixtures of isophthaloyl and terephthaloyl dichlorides, or comprising polycyclic moieties, including diphenyl dicarboxylic acid dichloride, diphenylether dicarboxylic acid dichloride, diphenylsulfone dicarboxylic acid dichloride, diphenylketone dicarboxylic acid dichloride, diphenylsulfide dicarboxylic acid dichloride, and naphthalenedicarboxylic acid dichloride, such as naphthalene-2,6-dicarboxylic acid dichloride; or comprising mixtures of aromatic dicarboxylic acid dichlorides comprising monocyclic moieties; or mixtures of aromatic dicarboxylic acid dichlorides comprising polycyclic moieties; or mixtures of aromatic dicarboxylic acid dichlorides comprising both monocyclic and polycyclic moieties. In some embodiments the dicarboxylic acid dichloride comprises mixtures containing isophthaloyl and/or terephthaloyl dichlorides as typically illustrated in Formula (VI).

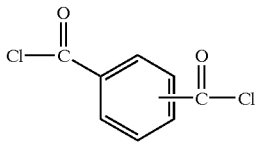

Formula (VI)

Either or both of isophthaloyl and terephthaloyl dichlorides may be present. In various embodiments the acid chlorides comprise mixtures of isophthaloyl and terephthaloyl dichloride in a molar ratio of isophthaloyl to terephthaloyl of in some embodiments about 0.25–4.0:1. When the isophthalate to terephthal ate ratio is greater than about 4.0:1, then unacceptable levels of cyclic oligomer may form. When the isophthalate to terephthalate ratio is less than about 0.25:1, then unacceptable levels of insoluble polymer may form. In some embodiments the molar ratio of isophthalate to terephthalate is about 0.4–2.5:1, and in other embodiments about 0.67–1.5:1.

The pH of the reaction mixture during addition of at least one acid chloride is maintained in one embodiment between about 4 and about 8.5, in another embodiment between about 5 and about 8.5, in another embodiment between about 5 and about 8, and in another embodiment between about 5 and about 7.5 throughout addition of the majority of the at least one acid chloride to the at least one resorcinol moiety. The pH is typically maintained through use of at least one base. Suitable bases to maintain the pH include alkali metal hydroxides, alkaline earth hydroxides, and alkaline earth oxides. In some embodiments the bases are potassium hydroxide or sodium hydroxide. In a particular embodiment the base is sodium hydroxide. The base to maintain pH may be included in the reaction mixture in any convenient form, such as solid or liquid. In a particular embodiment a base is included in the reaction mixture as an aqueous solution. In various embodiments base and acid chloride are added separately by means known in the art, including, but not limited to, one or more individual liquid addition vessels, gravimetric feeders, liquid metering pumps or metering systems, melt feed means and other known equipment.

In various embodiments at least a portion of said base is added to the reaction mixture as an aqueous solution simultaneously with acid chloride addition. In some embodiments the stoichiometric ratio of base to acid chloride is held at a substantially constant value during the addition process. Substantially constant in the present context means that any variation in ratio is adventitious. In particular embodiments the ratio of base to acid chloride during simultaneous addition is held at a substantially constant value in a range of between about 80% and about 105% of the stoichiometric value. In other particular embodiments the ratio of base to acid chloride during simultaneous addition is held at a substantially constant value in one embodiment in a range of between about 85% and about 105% of the stoichiometric value, in another embodiment in a range of between about 90% and about 105% of the stoichiometric value, in another embodiment in a range of between about 90% and about 100% of the stoichiometric value, and in another embodiment in a range of between about 90% and about 99% of the stoichiometric value.

In other embodiments the ratio of base to acid chloride during simultaneous addition is varied during the addition process, in some embodiments in a range of between about 0% and about 1000% of the stoichiometric value, in other embodiments in a range of between about 0% and about 500% of the stoichiometric value, in other embodiments in a range of between about 0% and about 200% of the stoichiometric value, in other embodiments in a range of between about 0% and about 125% of the stoichiometric value, in other embodiments in a range of between about 0% and about 105% of the stoichiometric value, in other embodiments in a range of between about 85% and about 110% of the stoichiometric value, in other embodiments in a range of between about 90% and about 105% of the stoichiometric value, in other embodiments in a range of between about 90% and about 100% of the stoichiometric value, and in other embodiments in a range of between about 90% and about 99% of the stoichiometric value. When particularly high ratios of base to acid chloride are employed during simultaneous addition, then such a high ratio may be typically employed for a short interval, for example in some embodiments during about 0.1% to about 5% of the acid chloride addition amount. Any addition ratio far from stoichiometric is typically accounted for during the rest of the acid chloride addition. Thus, in various embodiments the average addition ratio of base to acid chloride over the entire addition of acid chloride may be in a range for example in some embodiments of between about 85% and about 105% of stoichiometric, whereas the instantaneous addition ratio may be in a much broader range. In some embodiments any remaining base not added during acid chloride addition is added following completion of acid chloride addition. In still other embodiments acid chloride addition is started before the start of base addition so that there is an initial ratio of base to acid chloride of 0%. In particular embodiments the delay time may be such that the pH remains in the desired range of between about 4 and about 8.5. In still other embodiments base addition is stopped and then restarted at one or more points during acid chloride addition so that the stoichiometric ratio of base to acid chloride momentarily becomes 0%. In other particular embodiments the addition rates of base and of acid chloride are held, at constant values during the addition process. In other particular embodiments the addition rate of either base or acid chloride, or of both base and acid chloride are varied during the addition process.

In other embodiments of the invention base and acid chloride are introduced simultaneously to the reaction mixture at a substantially constant molar ratio of base to acid chloride in one embodiment for a time period of at least about 60% of total acid chloride addition, in another embodiment for at least about 70% of total acid chloride addition, in another embodiment for at least about 80% of total acid chloride addition, in another embodiment for at least about 90% of total acid chloride addition, in another embodiment for at least about 94% of total acid chloride addition, in another embodiment for at least about 98% of total acid chloride addition, in another embodiment for greater than 98% of total acid chloride addition, and in another embodiment for essentially 100% of total acid chloride addition. In other embodiments flow rates of acid chloride and of base may be varied during the acid chloride addition as long as the average molar flow rate ratio of base to acid chloride is maintained at a substantially constant value in one embodiment for a time period of at least about 60% of total acid chloride addition, in another embodiment for at least about 70% of total acid chloride addition, in another embodiment for at least about 80% of total acid chloride addition, in another embodiment for at least about 90% of total acid chloride addition, in another embodiment for at least about 94% of total acid chloride addition, in another embodiment for at least about 98% of total acid chloride addition, and in another embodiment for greater than 98% of total acid chloride addition.

In some particular embodiments base and acid chloride are added starting at a stoichiometric ratio in a range of between about 94% and 96% followed by increasing either continuously or in more than one step or in a single step the ratio to a value in a range of between about 96% and 120% during the course of the addition. In one particular embodiment the ratio is increased when the pH of the reaction mixture begins to fall below a value in a range of between about 6 and 7.5. In other particular embodiments the rate of addition of both base and of acid chloride is increased either continuously or in more than one step or in a single step during the course of addition. In other particular embodiments the rate of addition of both base and of acid chloride is decreased either continuously or in more than one step or in a single step during the course of addition. In other particular embodiments the rates of addition of base and of acid chloride are varied independently of one another. In various embodiments base may be added in sequence from more than one liquid addition vessel wherein the base is at different concentrations. In other embodiments base may be added in sequence from more than one liquid addition vessel at different rates of addition. In some embodiments depending upon such factors which include, but are not limited to, reactor configuration, stirrer geometry, stirring rate, temperature, total solvent volume, organic solvent volume, anhydride concentration, pH, the total time of addition of base and acid chloride may be less than about 120 minutes, in other embodiments in a range of between about 1 minute and about 60 minutes, in still other embodiments in a range of between about 2 minutes and about 30 minutes, and in still other embodiments in a range of between about 2 minutes and about 15 minutes.

In various embodiments of the present invention the addition of base and acid chloride in the defined ratios results in a pH of the reaction mixture in the range of between about 4 and about 8.5. Consequently, the course of the reaction can be measured by monitoring the amount of base added in addition to or in place of monitoring the reaction by measuring pH of the reaction mixture, for example using a pH electrode. This is an advantage when pH must be measured accurately and instantaneously in a viscous interfacial reaction mixture which may be difficult to accomplish.

The temperature of the reaction mixture may be any convenient temperature that provides a suitable reaction rate and a resorcinol arylate-containing polymer substantially free of anhydride linkages. Convenient temperatures include those from about 10° C. to the boiling point of the lowest boiling bulk component in the reaction mixture under the reaction conditions. The reaction may be run under pressure. In various embodiments the reactor pressure may be in the range of from about 0 pounds per square inch gauge reading (psig) to about 100 psig. In some embodiments the reaction temperature may be in a range of between ambient temperature and the boiling point of the water-organic solvent mixture under the reaction conditions. In one embodiment the reaction is performed at the boiling point of the organic solvent in the water-organic solvent mixture. In a particular embodiment the reaction is performed at the boiling point of dichloromethane.

In various embodiments the total molar amount of acid chloride groups added to the reaction mixture is stoichiometrically deficient relative to the total molar amount of phenolic groups. Said stoichiometric ratio may be desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes resorcinol moieties, and any mono-phenolic chain-stoppers and any tri- or tetra-phenolic branching agents which may be used. The stoichiometric ratio of total phenolic groups to total acid chloride groups is in one embodiment in a range of between about 1.9:1 and about 1.01:1, in another embodiment in a range of between about 1.5:1 and about 1.01:1, in another embodiment in a range of between about 1.25:1 and about 1.01:1, and in still another embodiment in a range of between about 1.10:1 and about 1.01:1.

The presence or absence of adventitious anhydride linkages following complete addition of the at least one acid chloride to the at least one resorcinol moiety will typically depend upon the exact stoichiometric ratio of reactants and the amount of catalyst present, as well as other variables. For example, if a sufficient molar excess of total phenolic groups is present, anhydride linkages are often found to be absent. In some embodiments a molar excess of at least about 1% and in other embodiments at least about 3% of total amount of phenolic groups over total amount of acid chloride groups may suffice to eliminate anhydride linkages under the reaction conditions. When anhydride linkages may be present, it is often desirable that the final pH of the reaction mixture be in a range in one embodiment of between about 7 and about 9, a in another embodiment of between about 7.2 and about 8.8, in another embodiment of between about 7.5 and about 8.5, and in still another embodiment of between about 7.5 and about 8.3 so that nucleophiles such as phenolic, phenoxide and/or hydroxide may be present to destroy any adventitious anhydride linkages. Therefore, in some of its embodiments the method of the invention may further comprise the step of adjusting the pH of the reaction mixture in one embodiment to a value in a range of between about 7 and about 9 following complete addition of the at least one acid chloride to the at least one resorcinol moiety. The pH may be adjusted by any convenient method, for example using an aqueous base such as aqueous sodium hydroxide.

Provided the final pH of the reaction mixture is in a range of between about 7 and about 9, the method of the invention in another embodiment may further comprise the step of stirring the reaction mixture for a time sufficient to destroy any adventitious anhydride linkages, should any be present. The necessary stirring time will depend upon reactor configuration, stirrer geometry, stirring rate, temperature, total solvent volume, organic solvent volume, anhydride concentration, pH, and other factors. Suitable stirring rates depend upon similar factors known to those skilled in the art and may readily be determined. In some embodiments suitable stirring rates are in a range of between about 50 rpm and about 600 rpm, in other embodiments in a range of between about 100 rpm and about 500 rpm, in other embodiments in a range of between about 200 rpm and about 500 rpm, and in still other embodiments in a range of between about 300 rpm and about 400 rpm. In some instances the necessary stirring time is essentially instantaneous, for example within seconds of pH adjustment to a value in a range of between about 7 and about 9, assuming any adventitious anhydride linkages were present to begin with. For typical laboratory scale reaction equipment a stirring time in one embodiment of at least about 1 minute, in another embodiment of at least about 3 minutes, and in another embodiment of at least about 5 minutes may be required. By this process nucleophiles, such as phenolic, phenoxide and/or hydroxide, may have time to destroy completely any adventitious anhydride linkages, should any be present.

At least one chain-stopper (also referred to sometimes hereinafter as capping agent) may also be present in the method and compositions of the invention. One purpose of adding at least one chain-stopper is to limit the molecular weight of polymer comprising resorcinol-arylate polyester chain members, thus providing polymer-with controlled molecular weight and favorable processability. In some embodiments at least one chain-stopper is added when the resorcinol arylate-containing polymer is not required to have reactive end-groups for further application. In other embodiments at least some chain-stopper may be added when resorcinol arylate-containing polymer is to be either used in solution or recovered from solution for subsequent use such as in copolymer formation which may require the presence of reactive end-groups, typically phenolic hydroxy, on the resorcinol-arylate-comprising polyester segments. A chain-stopper may be at least one of mono-phenolic compounds, mono-carboxylic acid chlorides, and/or mono-chloroformates. The amount of chain-stopper added at any time during the reaction may be such as to cap all or at least a portion of polymer chain end-groups. Typically, the at least one chain-stopper, when present, may be present in quantities of 0.05 to 10 mole %, based on resorcinol moieties in the case of mono-phenolic compounds and based on acid dichlorides in the case mono-carboxylic acid chlorides and/or mono-chloroformates.

Suitable mono-phenolic compounds include monocyclic phenols, such as unsubstituted phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, in which in some embodiments about 47 to 89% of the hydrogen atoms are part of methyl groups as described in U.S. Pat. 4,334,053. For some embodiments a mono-phenolic UV screener is used as capping agent. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In various embodiments mono-phenolic chain-stoppers are at least one of phenol, p-cumylphenol, or resorcinol monobenzoate.

Suitable mono-carboxylic acid chlorides include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

Chain-stopper may be added to the reaction mixture in any convenient manner. In some embodiments chain-stopper can be combined together with the resorcinol moieties, can be contained in solution of acid chloride, can be added separately from acid chloride, or can be added to the reaction mixture after production of a precondensate. In some embodiments at least some of the chain-stopper is present in the reaction mixture before addition of acid chloride. In other embodiments all of the chain-stopper is present in the reaction mixture before addition of acid chloride. In some embodiments at least some of the chain-stopper is added to the reaction mixture during addition of acid chloride. In other embodiments all of the chain-stopper is added to the reaction mixture during or after addition of acid chloride. In other particular embodiments chain-stopper is added to the reaction mixture either continuously or in more than one step or in a single step during the course of acid chloride addition. In one example of continuous addition chain-stopper either in liquid or molten form is metered continuously either at a substantially constant rate or at a variable rate into the reaction mixture during the course of acid chloride addition. In one example of stepwise addition solid chain-stopper is added in portions or in a single portion to the reaction mixture during the course of acid chloride addition. If mono-carboxylic acid chlorides and/or mono-chloroformates are used as chain-stoppers, they are in some embodiments introduced mixed together with dicarboxylic acid dichlorides. These chain-stoppers can also be added to the reaction mixture at a moment when the dicarboxylic acid dichlorides have already reacted substantially or to completion. If phenolic compounds are used as chain-stoppers, they can be added to the reaction mixture in one embodiment during the reaction, or in another embodiment before the beginning of the reaction between resorcinol moiety and acid chloride moiety. When substantially hydroxy-terminated resorcinol arylate-containing precondensate or oligomers are desired, then chain-stopper may be absent or only present in small amounts to aid control of oligomer molecular weight.

In another embodiment the invention may encompass the inclusion of at least one branching agent such as a trifunctional or higher functional carboxylic acid chloride and/or trifunctional or higher functional phenol. Such branching agents, if included, can be used in various embodiments in quantities of 0.005 to 1 mole %, based on acid chlorides or resorcinol moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. In various embodiments phenolic branching agents may be introduced first with the resorcinol moieties or during the course of acid chloride addition, whilst acid chloride branching agents may be introduced together with acid dichlorides.

If desired, the resorcinol arylate polymers of the invention may be made by the present method further comprising the addition of a reducing agent. Suitable reducing agents include, for example, sodium sulfite, or a borohydride, such as sodium borohydride. When present, any reducing agents are typically used in quantities of from 0.25 to 2 mole %, based on moles of resorcinol moiety. The reaction mixture may also comprise a metal chelating agent such as sodium gluconate.

In some embodiments the resorcinol arylate-containing polymer may be recovered from the reaction mixture. Recovery methods are well known to those skilled in the art and may include one or more steps of acidification of the mixture, for example with at least one of an inorganic acid or an organic acid as described hereinabove; subjecting the mixture to liquid-liquid phase separation; washing the organic phase with water and/or a dilute acid such as at least one of an inorganic acid or an organic acid as described hereinabove; precipitating by usual methods such as through treatment with water or anti-solvent precipitation with, for example, an alcohol such as methanol, ethanol, and/or isopropanol; isolating the resulting precipitates; and drying to remove residual solvents. It is also contemplated, however, to proceed to a subsequent process without acidification or phase separation, and this is often possible without loss of yield or purity in the resorcinol arylate-containing polymer.

In another embodiment the resorcinol arylate-containing polymer may remain in solution for subsequent process steps. In a particular embodiment the entire interfacial reaction mixture comprising resorcinol arylate-containing polymer, water, and a water-immiscible organic solvent is carried on to subsequent process steps such as, but not limited to, phosgenation to prepare block copolyestercarbonate.

In one of its embodiments the invention comprises thermally stable resorcinol arylate polyesters made by the present method and substantially free of anhydride linkages linking at least two mers of the polyester chain. In a particular embodiment said polyesters comprise dicarboxylic acid residues derived from a mixture of iso- and terephthalic acids as illustrated in Formula (VII):

Formula (VII)

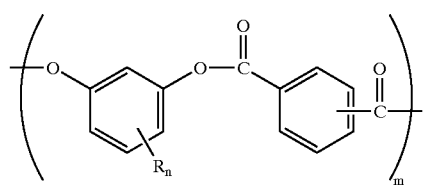

wherein R is at least one of $C_{1-12}$ alkyl or halogen, n is 0–3, and m is at least about 8. In various embodiments n is zero and m is between about 4 and about 300. The molar ratio of isophthalate to terephthalate is in one embodiment in a range of about 0.25–4.0:1, in another, embodiment in a range of about 0.4–2.5:1, and in still another embodiment in a range of about 0.67–1.5:1. Substantially free of anhydride linkages means that said polyesters show decrease in molecular weight in one embodiment of less than 30%, in another embodiment of less than 20%, in another embodiment of less than 10%, and in another embodiment of less than 5% upon heating said polymer at a temperature of about 280–290° C. for five minutes.

The present invention also encompasses thermally stable copolymers containing segments comprising resorcinol arylate polyester chain members made by the present method and substantially free of anhydride linkages linking at least two mers of the copolymer chain. Thus, in another of its embodiments the present invention comprises thermally stable copolyesters comprising resorcinol arylate polyester chain members in combination with chain members derived from dicarboxylic acid alkylene or diol alkylene chain members (so-called "soft-block" segments), said copolyesters being substantially free of anhydride linkages in the polyester segments. Substantially free of anhydride linkages means that the copolyesters show decrease in molecular weight in one embodiment of less than 30%, in another embodiment of less than 20%, in another embodiment of less than 10%, and in another embodiment of less than 5% upon heating said copolyester at a temperature of about 280–290° C. for five minutes. Related copolyesters containing soft-block segments are disclosed in commonly owned U.S. Pat. No. 5,916,997.

The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas (I), (VIII), and (IX):

Formula (I)

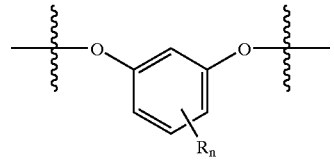

Formlula (VIII)

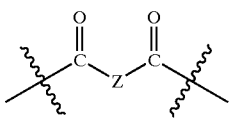

Formula (IX)

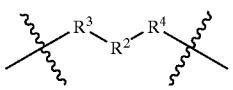

wherein R is at least one of $C_{1-12}$ alkyl or halogen, n is 0–3, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

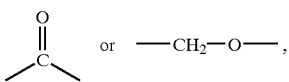

wherein Formula (IX) contributes in some embodiments from about 1 to about 45 mole percent to the ester linkages of the polyester. Additional embodiments of the present invention provide a composition wherein Formula (IX) contributes in some embodiments from about 5 to about 40 mole percent to the ester linkages of the polyester, and in other embodiments from about 5 to about 20 mole percent to the ester linkages of the polyester. Other embodiments provide a composition wherein $R^2$ represents $C_{3-14}$ straight chain alkylene or $C_{5-6}$ cycloalkylene. Still other embodiments provide a composition wherein $R^2$ represents $C_{3-10}$ straight-chain alkylene or $C_6$-cycloalkylene. Formula (VIII) represents an aromatic dicarboxylic acid residue. The divalent aromatic radical Z in Formula (VIII) may be derived from at least one or the suitable dicarboxylic acid residues as defined hereinabove, for example at least one of-1,3-phenylene, 1,4-phenylene, or 2,6-naphthylene. In some embodiments Z comprises at least about 40 mole percent 1,3-phenylene. In various embodiments of copolyesters containing soft-block chain members n in Formula (I) is zero.

In some embodiments copolyesters containing resorcinol arylate chain members are those comprising from about 1 to about 45 mole % sebacate or cyclohexane-1,4-dicarboxylate units. In a particular embodiment a copolyester containing resorcinol arylate chain members is one comprising resorcinol isophthalate and resorcinol sebacate units in molar ratio between 8.5:1.5 and 9.5:0.5. In a representative procedure said copolyester is prepared using sebacoyl chloride in combination with isophthaloyl dichloride.

In another of its embodiments the present invention comprises thermally stable block copolyestercarbonates comprising polyester block segments in combination with organic carbonate block segments. Polyester block segments comprise resorcinol arylate-containing chain members. The segments comprising resorcinol arylate chain members in such copolymers are substantially free of anhydride linkages. Substantially free of anhydride linkages means that the copolyestercarbonates show decrease in molecular weight in one embodiment of less than 10% and in another embodiment of less than 5% upon heating said copolyestercarbonate at a temperature of about 280–290° C. for five minutes. Related block copolyestercarbonates are disclosed in published PCT Application WO 00/26275.

The block copolyestercarbonates include those comprising alternating arylate and organic carbonate blocks, typically as illustrated in Formula (X), wherein R is at least one of $C_{1-12}$ alkyl or halogen, n is 0–3, and $R^5$ is at least one divalent organic radical:

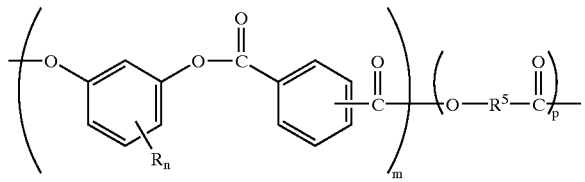

Formula (X)

The arylate blocks have a degree of polymerization (DP), represented by m, in one embodiment of at least about 4, in another embodiment of at least about 10, a in another embodiment of at least about 20 and in still another embodiment of about 30–150. In some embodiments m is at least about 3, in other embodiments at least about 10 and in still other embodiments about 20–300. In other embodiments m is between about 20 and about 50. The DP of the organic carbonate blocks, represented by p, is in one embodiment at least about 1, in another embodiment at least about 3, in another embodiment at least about 10, and in still another embodiment about 20–200. In other embodiments p has a value in a range of between about 20 and about 50. Within the context of the invention "alternating carbonate and arylate blocks" means that the copolyestercarbonates comprise at least one carbonate block and at least one arylate block. In a particular embodiment block copolyestercarbonates comprise at least one arylate block and at least two carbonate blocks. In another particular embodiment block copolyestercarbonates comprise an A-B-A architecture with at least one arylate block ("B") and at least two carbonate blocks ("A"). In another particular embodiment block copolyestercarbonates comprise a B-A-B architecture with at least two arylate blocks ("B") and at least one carbonate block ("A"). Mixtures of block copolyestercarbonates with different architectures are also within the scope of the invention.

In the copolyestercarbonates of the present invention the distribution of the blocks may be such as to provide a copolymer having any desired weight proportion of arylate blocks in relation to carbonate blocks. Different applications may require different weight proportion of arylate blocks in relation to carbonate blocks. In some embodiments some injection molding applications may require from 5 to 60% by weight arylate blocks. In other embodiments some film applications may require 60 to 95% by weight arylate blocks. The copolyestercarbonates contain in one embodiment about 10% to about 99% by weight arylate blocks: in another embodiment about 40% to about 99% by weight arylate blocks; in another embodiment about 60% to about 98% by weight arylate blocks; in another embodiment about 80% to about 96% by weight arylate blocks; and in still another embodiment about 85% to about 95% by weight arylate blocks.

Although a mixture of iso- and terephthalate is illustrated in Formula (X), the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In some embodiments n is zero and the arylate blocks comprise dicarboxylic acid residues derived from a mixture of iso- and terephthalic acid residues, wherein the molar ratio of isophthalate to terephthalate is in one embodiment in a range of about 0.25–4.0:1, in another embodiment in a range of about 0.4–2.5:1, and in still another embodiment in a range of about 0.67–1.5: 1.

In the organic carbonate blocks, each $R^5$ is independently a divalent organic radical. In various embodiments said radical is derived from at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, and similar radicals such as those which correspond to the dihydroxy-substituted aromatic hydrocarbons disclosed by name or formula (generic or specific) in U.S. Pat. 4,217,438.

In some embodiments of the invention dihydroxy-substituted aromatic hydrocarbons include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl) propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,4'-dihydroxydiphenylmethane; bis(2-hydroxyphenyl) methane; bis(4-hydroxy-phenyl)methane; bis(4-hydroxy-5-nitrophenyl)methane; bis(4-hydroxy-2,6-dimethyl-3- methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; hydroquinone; resorcinol: $C_{1-3}$ alkyl-substituted. resorcinols. In a particular embodiment the dihydroxy-substituted aromatic hydrocarbon comprises bisphenol A.

Suitable dihydroxy-substituted aromatic hydrocarbons also include those containing indane structural units such as represented by the Formula (XI), which compound is 3-(4-hydroxyphenyl)-1,1,3-trimethylindan-5-ol, and by the Formula (XII), which compound is 1-(4-hydroxyphenyl)-1,3,3-trimethylindan-5-ol:

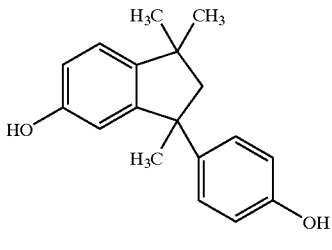
(XI)

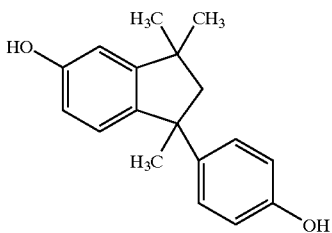
(XII)

Included among suitable dihydroxy-substituted aromatic hydrocarbons are the 2,2,2',2'-tetrahydro-1,1'-spirobi[1H-indene]diols having Formula (XIII):

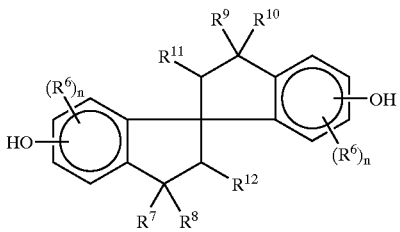
(XIII)

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive; In a particular embodiment the 2,2,2',2'-tetrahydro-1,1'-spirobi[1H-indene]-diol is 2,2,2',2',-tetrahydro-3,3,3',3'-tetramethyl-1,1'-spirobi[1H-indene]-6,6'-diol (sometimes known as "SBI").

The term "alkyl" as used in the various embodiments of the present invention is intended to designate both normal alkyl, branched alkyl, aralkyl, cycloalkyl, and bicycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 12 ring carbon atoms. Some illustrative non-limiting examples of these aryl radicals include phenyl, biphenyl, and naphthyl.

In some embodiments each $R^5$ is an aromatic organic radical and in other embodiments a radical of Formula (XIV):

$$-A^1-Y-A^2-$$  Formula (XIV)

wherein each $A^1$ and $A^2$ is a monocyclic divalent aryl radical and Y is a bridging radical in which one or two carbon atoms separate $A^1$ and $A^2$. The free valence bonds in Formula (XIV) are usually in the meta or para positions of $A^1$ and $A^2$ in relation to Y. Compounds in which $R^5$ has Formula (XIV) are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula (XIV), $A^1$ and $A^2$ typically represent unsubstituted phenylene or substituted derivatives thereof, illustrative substituents (one or more) being alkyl, alkenyl, and halogen (for example bromo, chloro, or fluoro). In particular embodiments $A^1$ and A2 are unsubstituted phenylene radicals. Both $A^1$ and A2 are often p-phenylene, although both may be o- or m-phenylene or one o- or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —O—, —S—, —SO— or —$SO_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals. Gem-alkylene (commonly known as "alkylidene") radicals are used in many embodiments. Also included, however, are unsaturated radicals. For reasons of availability and particular suitability for the purposes of this invention, a commonly embodied bisphenol is 2,2-bis(4-hydroxyphenyl)propane (bisphenol-A or BPA), in which Y is isopropylidene and $A^1$ and $A^2$ are each p-phenylene.

Depending upon whether or not any unreacted 1,3-dihydroxybenzene moiety is present in the reaction mixture or is added to the reaction mixture subsequently, $R^5$ in the carbonate blocks may consist of or at least partially comprise a radical derived from a 1,3-dihydroxybenzene moiety. Therefore, in one embodiment of the present invention the copolyestercarbonates comprise carbonate blocks with $R^5$ radicals derived from a dihydroxy-substituted aromatic hydrocarbon identical to at least one 1,3-dihydroxybenzene moiety in the polyarylate blocks. In another embodiment the copolyestercarbonates comprise carbonate blocks with $R^5$ radicals derived from a dihydroxy-substituted aromatic hydrocarbon different from any 1,3-dihydroxybenzene moiety in the polyarylate blocks. In yet another embodiment the copolyestercarbonates comprise carbonate blocks containing a mixture of $R^5$ radicals derived from dihydroxy-substituted aromatic hydrocarbons, at least one of which is the same as and at least one of which is different from any 1,3-dihydroxybenzene moiety in the polyarylate blocks. When a mixture of $R^5$ radicals derived from dihydroxy-substituted aromatic -hydrocarbons is present, then the molar ratio of dihydroxy compounds identical, to those present in the polyarylate blocks to those dihydroxy compounds different from those present in the polyarylate blocks is typically about 1:999 to 999:1. In some particular embodiments the copolyestercarbonates comprise carbonate blocks containing a mixture of $R^5$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising resorcinol arylate chain members and blocks comprising organic carbonate chain members may comprise at least one of carbonate block. In another particular embodiment the copolyestercarbonate is substantially comprised of an A-B-A triblock carbonate-ester-carbonate copolymer with carbonate linkages between the resorcinol arylate block and organic carbonate end-blocks. In another particular embodiment the block copolyestercarbonate is substantially comprised of a B-A-B triblock ester-carbonate-ester copolymer with carbonate linkages between the organic carbonate block and the resorcinol arylate end-blocks. Mixtures of block copolyestercarbonates with different architectures linked by carbonate linkages or ester linkages, or mixtures of carbonate and ester linkages are also within the scope of the invention.

In another embodiment the copolyestercarbonate comprises arylate blocks linked by carbonate linkages, for example as shown in the representative structure of Formula (XVII):

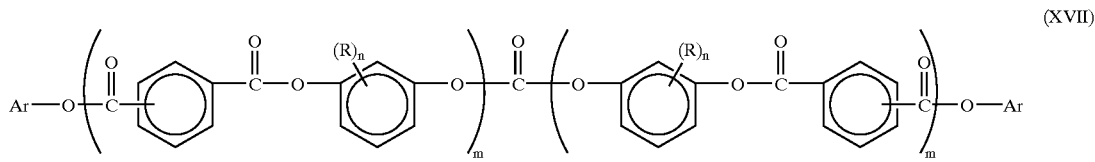

(XVII)

(a) an ester linkage between a suitable dicarboxylic acid residue of an arylate moiety and an —O—$R^5$—O— moiety of an organic carbonate moiety, for example as typically illustrated in the structural moiety of Formula (XV), wherein $R^5$ is as previously defined:

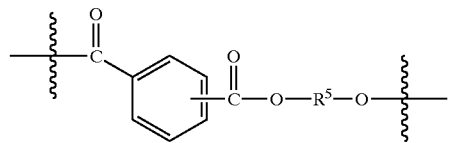

Formula (XV)

and (b) a carbonate linkage between a diphenol residue of a resorcinol arylate moiety and a —(C=O)—O— moiety of an organic carbonate moiety as shown in the structural moiety of Formula (XVI), wherein R and n are as previously defined:

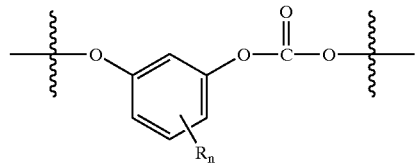

Formula (XVI)

The presence of a significant proportion of ester linkages of the type (a) may result in undesirable color formation in the copolyestercarbonates. Although the invention is not limited by theory, it is believed that color may arise, for example, when $R^5$ in Formula (XV) is bisphenol A and the moiety of Formula (XV) undergoes Fries rearrangement during subsequent processing and/or light-exposure. In a particular embodiment the copolyestercarbonate is substantially comprised of a diblock copolymer with a carbonate linkage between a resorcinol arylate block and an organic wherein R is at least one of $C_{1-12}$ alkyl or halogen, n is 0–3, Ar is an aromatic moiety, and each m independently is in one embodiment at least about 4, in another embodiment at least about 10, in another embodiment at least about 20 and in still another embodiment about 30–150, and the arylate structural units are as described for formula (X) above. In some embodiments. Ar comprises a hydroxyphenol residue derived from a 1,3-dihydroxybenzene moiety or an aryloxy-carboxyphenyl residue derived from an aromatic dicarboxylic acid diarylester. In other embodiments arylate blocks in formula (XVII) may be terminated, for example with a mono-phenolic moiety such as a mono-phenolic chain-stopper. Copolyestercarbonates comprising formula (XVII) may arise from reaction of hydroxy-terminated polyester intermediate With a carbonate precursor in the substantial absence of any dihydroxy compound different from the hydroxy-terminated polyester intermediate. In other embodiments the copolyestercarbonate may comprise a mixture of copolyestercarbonates with different structural units and different architectures, for example as described herein.

Copolyestercarbonates comprising a thermally stable resorcinol arylate block and an organic carbonate block are prepared in one embodiment from resorcinol arylate-containing polyester intermediates prepared by methods of the invention and containing at least some hydroxy-terminal sites on chains. In some embodiments said intermediates contain at least one and often two hydroxy-terminal sites on a majority of chains. In various embodiments said intermediates may be prepared by methods of the invention wherein the molecular weight and carboxylic acid end-group concentration of the intermediate are minimized and the phenolic hydroxy end-group concentration is maximized. Said intermediates have weight average molecular weight (vs. polystyrene standards) in one embodiment of at least about 900, in another embodiment of at least about 2000, and in still another embodiment of at least about 4000. In particular embodiments said polyester intermediates have weight average molecular, weights in one embodiment of about 4,000 to about 40,000, in another embodiment of about 10,000 to about 30,000, in another embodiment of about 16,000 to about 25,000, and in another embodiment of about 18,000 to about 22,000. In some embodiments said intermediates have less than about 1800 ppm carboxylic acid end-groups, and in other embodiments less than about 1500 ppm carboxylic acid end-groups. In some embodiments said intermediates have about 300–1500 ppm carboxylic acid end-groups, and in other embodiments about 400–900 ppm carboxylic acid end-groups. In other embodiments said intermediates have about 2–37,000 ppm phenolic hydroxy end-groups, and in still other embodiments about 2400–9700 ppm phenolic hydroxy end-groups. Resorcinol arylate-containing polyester intermediates cave in many embodiments a higher concentration of phenolic end-groups compared to carboxylic acid end-groups. Carboxylic acid, end-groups, may be present, for example, through hydrolysis of acid chloride groups under the reaction conditions and as adventitious acid groups present in dicarboxylic acid dichloride starting material.

Thermally stable copolyestercarbonates may be prepared in various embodiments by reacting said resorcinol arylate-containing intermediates with a carbonate precursor, often in the presence of at least one catalyst and at least one dihydroxy-substituted aromatic hydrocarbon different from hydroxy-terminated resorcinol arylate-containing intermediate. In one embodiment the carbonate precursor is phosgene. When phosgene is employed, this synthesis step may be conducted according to art-recognized interfacial procedures (i.e., also in a two-phase system) employing a suitable interfacial polymerization catalyst and an alkaline reagent, for example sodium hydroxide. Optionally a branching agent and/or a chain termination agent such as described herein may be present.

When present, at least one dihydroxy-substituted aromatic hydrocarbon different from hydroxy-terminated resorcinol arylate-containing intermediate may be introduced into the reaction mixture for copolyestercarbonate synthesis through any convenient method of combination. In one embodiment at least one dihydroxy-substituted aromatic hydrocarbon may be present as unreacted 1,3-dihydroxybenzene moiety from resorcinol arylate-containing polyester synthesis. In another embodiment at least one dihydroxy-substituted aromatic hydrocarbon may be added following polyester synthesis, before or during reaction with carbonate precursor in copolyestercarbonate synthesis. In a particular embodiment at least one dihydroxy-substituted aromatic hydrocarbon is present as unreacted 1,3-dihydroxybenzene moiety from resorcinol arylate-containing polyester synthesis and at least one dihydroxy-substituted aromatic hydrocarbon is added following polyester synthesis, before or during reaction with carbonate precursor in copolyestercarbonate synthesis. Any dihydroxy compound added following polyester synthesis, before or during reaction with carbonate precursor in copolyestercarbonate synthesis, may be the same as or different from any 1,3-dihydroxybenzene moiety present initially in polyester synthesis. In another particular embodiment the dihydroxy-substituted aromatic hydrocarbon comprises at least one of unsubstituted resorcinol or substituted resorcinol from polyester synthesis and at least one dihydroxy-substituted aromatic hydrocarbon added following polyester synthesis different from unsubstituted. resorcinol or substituted resorcinol. In another particular embodiment a molar excess of 1,3-dihydroxybenzene (relative to total moles acid chloride species present) is employed in polyester synthesis, in which case there may be some unreacted 1,3-dihydroxybenzene remaining, and bisphenol A is added before or during reaction with carbonate precursor in copolyestercarbonate synthesis. The amount of any 1,3-dihydroxybenzene moiety remaining unreacted from polyester synthesis is in one embodiment less than about 38 mole %, in another embodiment less than about 30 mole %, in another embodiment less than about 15 mole %, in another embodiment less than about 10 mole %, and in still another embodiment less than about 5 mole % of the 1,3-dihydroxybenzene moiety initially present in polyester synthesis. In another particular embodiment the amount of 1,3-dihydroxybenzene moiety remaining unreacted from polyester synthesis is less than about 2 mole % of the 1,3-dihydroxybenzene moiety initially present in polyester synthesis. In another particular embodiment the amount of 1,3-dihydroxybenzene moiety remaining unreacted from polyester synthesis is in a range of between about 2 mole % and about 10 mole % of the 1,3-dihydroxybenzene moiety initially present in polyester synthesis.

Following completion of both reactions, the block copolyestercarbonate may be used in solution or transferred by any convenient procedure to some other solvent for use. In some embodiments the copolyestercarbonate is recovered and isolated from solution by conventional procedures. These may include, for example, at least one step selected from the group consisting of anti-solvent precipitation, washing, drying and devolatilization-pelletization or film formation via extrusion.

Block copolyestercarbonates made by the method of the present invention have in one embodiment less than about 100 ppm, in another embodiment less than about 50 ppm, and in still another embodiment less than about 20 ppm phenolic end-groups. Said copolymers contain in one embodiment less than about 50 ppm and in another embodiment less than about 25 ppm free 1,3-dihydroxybenzene moiety. The copolymers have in one embodiment less than about 2000 ppm, in another embodiment less than about 500 ppm, in another embodiment less than about 200 ppm, in another embodiment less than about 100 ppm, and in still another embodiment less than about 50 ppm carboxylic acid end-groups. In some embodiments the copolymers have carboxylic acid end-group concentration in a range of between 0 ppm and about 100 ppm. The concentration of carboxylic acid end-groups in the copolyestercarbonates is typically less than that present in the polyester intermediate from step A. Carboxylic acid end-groups in said polyester intermediate may react with carbonate precursor in the copolyestercarbonate synthesis step. For example, when phosgene is the carbonate precursor, carboxylic acid groups may react to form carboxylic acid chlorides which may then react with any phenolic groups present, for example phenolic end-groups on polyester intermediates and any free 1,3-dihydroxybenzene moiety, for example added in polyester synthesis.

In the methods of making copolyestercarbonates in the present invention there may be present following phosgenation some polyester intermediate which is not covalently bound to a carbonate moiety. For example there may be present in the phosgenation reaction mixture at least a portion of polyester intermediate possessing end-groups which are not reactive with carbonate precursor. Illustrative examples of such end-groups may include carboxylic acid or carboxylic acid chloride or end-capped species without any functional group. Therefore, in another of its embodiments the present invention comprises a method for making the copolyestercarbonates of the invention in combination with a polyarylate containing structural units comprising those of the polyarylate blocks in the copolyestercarbonate, said polyarylate being made in the same process as said copolyestercarbonate. When it is desired to isolate substantially pure copolyestercarbonate, then the level of said polyarylate present in copolyestercarbonate is in one embodiment less than about 20 wt. %, in another embodiment less than about 10 wt. % and in still another embodiment less than about 4 wt. % of copolyestercarbonate. In particular embodiments the level of said polyarylate is less than about 1 wt. % of copolyestercarbonate isolated substantially pure. When it is desired to prepare a blend of copolyestercarbonate with polyarylate through methods as described herein, then proportions of the copolyestercarbonates in such blends are typically up to about 80 wt. % of the composition with the remainder being polyarylate.

When copolyestercarbonate synthesis is performed in the presence of at least one dihydroxy-substituted aromatic hydrocarbon moiety different from hydroxy-terminated polyester intermediates then a polycarbonate may be formed which is not covalently bound to polyester intermediate. In one embodiment wherein at least two different dihydroxy-substituted aromatic hydrocarbon moieties different from hydroxy-terminated polyester intermediate are present, then a polycarbonate copolymer may form. In a particular embodiment wherein a 1,3-dihydroxybenzene moiety is present along with a second dihydroxy-substituted aromatic hydrocarbon, then a polycarbonate copolymer may form with structural units derived from both 1,3-dihydroxybenzene moiety and from the second dihydroxy-substituted aromatic hydrocarbon. Therefore, in another of its embodiments the present invention comprises the said copolyestercarbonates in combination with at least one polycarbonate, said polycarbonate being made in the same process as the carbonate block-forming step of said copolyestercarbonate synthesis. In a particular embodiment a polycarbonate is formed containing structural units comprising those of the polycarbonate blocks in the copolyestercarbonate. In another particular embodiment a polycarbonate is formed containing structural units comprising those of the polycarbonate blocks in the copolyestercarbonate and those derived from any second dihydroxy-substituted aromatic hydrocarbon present in the reaction mixture. In another particular embodiment a polycarbonate is formed comprising structural units derived from a 1,3-dihydroxybenzene moiety. In still another particular embodiment a polycarbonate is formed comprising structural units derived from a 1,3-dihydroxybenzene moiety and bisphenol A. When it is desired to isolate substantially pure copolyestercarbonate, then the level of said polycarbonate present in copolyestercarbonate is in some embodiments less than about 20 wt. %, in other embodiments less than about 10 wt. % and in still other embodiments less than about 4 wt. % of copolyestercarbonate. In other particular embodiments the level of said polycarbonate is less than about 2 wt. % of copolyestercarbonate isolated substantially pure. When it is desired to prepare a blend of copolyestercarbonate with at least one polycarbonate through synthesis by methods of the invention, then at least one polycarbonate in the blends may be prepared essentially simultaneously with carbonate block formation in the copolyestercarbonate synthesis. Alternatively, at least one polycarbonate in the blends may be prepared after the block-copolyestercarbonate formation is at least partially, or essentially complete, for example, in one option, through addition of additional components comprising dihydroxy-substituted aromatic hydrocarbon moiety, carbonate precursor, and, optionally, chain-stopper. The proportions of the copolyestercarbonates in such blends are determined chiefly by the resulting proportions of arylate blocks, which comprise the active weatherability-improving entities, typical proportions providing about 10–50% by weight of arylate blocks in the blend. Typically blends of copolyestercarbonate with up to about 95 wt. % polycarbonate may be prepared through synthesis by methods of the invention. In a particular embodiment blends of copolyestercarbonate comprising bisphenol A carbonate blocks may be prepared along with bisphenol A comprising polycarbonate through synthesis by methods of the invention in the presence of phosgene.

It is believed that the weatherability and certain other beneficial properties of the polymers comprising resorcinol arylate polyester chain members of the invention are attributable, at least in part, to the occurrence of thermally or photochemically induced Fries rearrangement of arylate blocks to yield o-hydroxybenzophenone moieties or analogs thereof which serve as stabilizers to UV radiation. More particularly, at least a portion of resorcinol arylate polyester chain members can rearrange to yield chain members with at least one hydroxy group ortho to at least one ketone group. Such rearranged chain members are typically o-hydroxybenzophenone-type chain members, often comprising one or more of the following structural moieties in Formulas (XVIII), (XIX), and (XX):

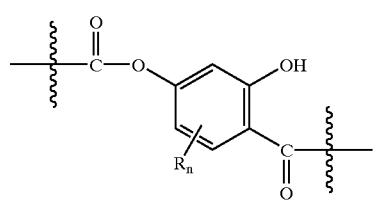

Formula (XVIII)

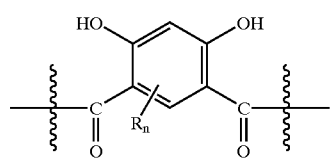

Formula (XIX)

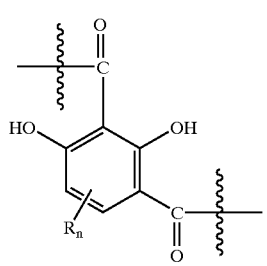

Formula (XX)

wherein R and n are as previously defined. The o-hydroxybenzophenone-type chain members resulting from rearrangement of resorcinol arylate chain members can be present in resorcinol arylate polyesters and in resorcinol arylate polyester-containing copolymers, including resorcinol arylate-containing copolyestercarbonates and resorcinol arylate-containing copolyesters containing soft-blocks. It is also contemplated to introduce moieties of the types illustrated in Formulas (XVIII), (XIX), and (XX) via synthesis and polymerization of appropriate monomers in both homopolymers and copolymers by the method of the present invention. In various embodiments the present invention provides thermally stable polyesters, copolyestercarbonates, and copolyesters comprising structural units represented by Formulas (III) and (XVIII), wherein the molar ratio of structural units represented by Formula (III) to structural units represented by Formula (XVIII) ranges in one embodiment from about 99:1 to about 1:1, and in another embodiment from about 99:1 to about 80:20.

The polymers and copolymers comprising thermally stable resorcinol arylate polyester chain members may also be employed as weatherability-improving additives in blends with at least one other polymer such as condensation polymers, especially polycarbonates (hereinafter sometimes designated "PC"), polyesters, polyetherimides, polyphenylene ethers, and addition polymers. Related blends are disclosed in commonly owned U.S. Pat. No. 6,143,839.

The polycarbonates in the blend compositions of the invention are, for the most part, similar in molecular structure to the carbonate blocks of the block copolyestercarbonate as described hereinabove. In particular embodiments a polycarbonate is at least one of a bisphenol-A homo- or copolycarbonate. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates). In particular embodiments polyesters are poly(ethylene terephthalate) and poly(1,4-butylene terephthalate).

Copolyestercarbonates may also be used in blends with polymers comprising resorcinol arylate polyester chain members. Such copolymers comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 030,331; 3,169,121; 3,207,814; 4,194,038; 4,156,069; 4,238,596; 4,238,597; 4,487;896; and 4,506,065.

Suitable addition polymers include homopolymers, and copolymers, especially homopolymers of alkenylaromatic compounds, such as polystyrene, including syndiotactic polystyrene, and copolymers of alkenylaromatic compounds with ethylenically unsaturated nitriles, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers.

In another embodiment the invention encompasses blends of polymers and/or copolymers comprising thermally stable resorcinol arylate polyester chain members with at least two other polymers. Said at least two other polymers may comprise miscible, immiscible, and compatibilized blends including, but not limited to, PC/ABS, PC/ASA, PC/PBT, PC/PET, PC/polysulfone, PC/polyetherimide, polyester/polyetherimide, polyphenylene ether/polystyrene, polyphenylene ether/polyamide, and polyphenylene ether/polyester.

The blend compositions of the invention may be prepared by such conventional operations as solvent blending and melt blending. In one embodiment the method for blend preparation is melt blending such as by extrusion. The blends may additionally contain art-recognized additives including pigments, dyes, impact modifiers, UV screeners, flame retardants, fillers, stabilizers, flow aids, ester interchange inhibitors, and mold release agents. It is intended that the blend compositions include simple physical blends and any reaction products thereof, as illustrated, for example, by polyester-polycarbonate transesterification products.

Proportions of the polymers comprising resorcinol arylate polyester chain members in such blends are determined chiefly by the resulting proportions of arylate blocks, which most often comprise the active weatherability-improving entities, typical proportions providing about 10–50% by weight of arylate blocks in the blend. In blends where some degree of incompatibility may exist between the polymers comprising resorcinol arylate polyester chain members of the invention and the condensation polymers or addition polymers with which they may be combined, said blends are sometimes not fully transparent. However, transparent blends may often be prepared, if desired, by, adjusting the length of the arylate blocks in the polymers comprising resorcinol arylate polyester chain-members. The other properties of said blends are generally excellent.

Compositions comprising resorcinol arylate polyester chain members made by various embodiments of the method of the invention typically have significantly lower color, both before and after thermal processing, than related compositions made by melt methods, interfacial methods, and solution methods of the prior art. In particular, melt methods often provide resorcinol arylate polyester with tan to dark brown color while the present interfacial method provides very lightly colored or essentially colorless polyester. The present compositions may be used in various applications, especially those involving outdoor use and storage, and hence requiring resistance to weathering. Their light transmitting properties are often similar to those of polycarbonates. Thus, they are often substantially transparent and colorless, and may often be employed as substitutes for polycarbonates in the fabrication of transparent sheet material when improved weatherability is mandated.

In another embodiment the present invention comprises multilayer articles comprising a substrate layer comprising at least one thermoplastic polymer, thermoset polymer, cellulosic material, glass, ceramic, or metal, and at least one coating layer thereon, said coating layer comprising at least one polymer comprising structural units derived from at least one 1,3-dihydroxybenzene moiety and at least one aromatic dicarboxylic acid moiety and prepared by methods described in the present invention. In the present context a multilayer article is one containing at least two layers. In various embodiments a coating layer comprises at least one thermally stable polymer comprising resorcinol arylate polyester chain members substantially free of anhydride linkages linking at least two mers of the polymer chain. Optionally, the multilayer articles may further comprise an interlayer, for example an adhesive interlayer, between any substrate layer and any thermally stable polymer coating layer. Multilayer articles of the invention include, but are not limited to, those which comprise a substrate layer and a coating layer of said thermally stable polymer; those which comprise a substrate layer with a coating layer of said thermally stable polymer on each side of said substrate layer; and those which comprise a substrate layer and at least one coating layer of said thermally stable polymer with at least one interlayer between a substrate layer and a coating layer. Any-interlayer may be transparent, translucent, or opaque, and/or may contain an additive, for example a colorant or decorative material such as metal flake. If desired, an overlayer may be included over the coating layer of thermally stable polymer, for example to provide abrasion or scratch resistance. The substrate layer, coating layer of thermally stable polymer, and any interlayers or overcoating layers are often in contiguous contact with one another. In another embodiment a multilayer article comprises (a) at least one coating layer comprising at least one polymer comprising structural units derived from at least one 1,3-dihydroxybenzene moiety and at least one aromatic dicarboxylic acid moiety; (b) at least one second layer comprising a polymer comprising carbonate structural units; (c) an adhesive layer; and (d) a substrate layer, wherein the coating layer is in contiguous superposed contact with the second layer, and the adhesive layer is in contiguous contact with the second layer and the substrate layer. In a particular embodiment at least one second layer comprises a polycarbonate, for example a bisphenol A homopolycarbonate, and the adhesive layer comprises a polyurethane.

Within the context of the present invention it should be understood that any coating layer comprising a thermally stable polymer comprising resorcinol arylate polyester chain members will also include polymer comprising o-hydroxybenzophenone or analogous chain members resulting from Fries rearrangement of said resorcinol arylate chain members, for example after exposure of said coating layer to UV-light. Typically, a preponderance of polymer comprising o-hydroxy-benzophenone or analogous chain members will be on that side or sides of said coating layer exposed to UV-light and will overlay in a contiguous superposed layer or layers that polymer comprising unrearranged resorcinol arylate chain members. If it is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

In various embodiments coating layers and any optional intermediate layers such as so-called second layers as described above may also comprise art recognized additives including, but not limited Co, colorants, pigments, dyes, color stabilizing additives, auxiliary UV screeners, fillers, stabilizers, ester interchange inhibitors, and mold release agents.

In some embodiments coating layers may comprise auxiliary UV screeners. Illustrative UV screeners include, but are not limited to, hydroxybenzophenones, hydroxybenzotriazoles, hydroxybenzotriazines, cyanoacrylates, oxanilides, benzoxazinones and those disclosed in standard reference works such as "Plastics Additives Handbook", 5th edition, edited by R. Gächter and H M üller, Hanser Publishers. Illustrative UV screeners also include nano-size inorganic materials such as titanium oxide, cerium oxide, and zinc oxide, all with particle size less than about 100 nanometers.

When present, the amount of auxiliary UV screener employed is in one embodiment in a range between about 0.05 wt. % and 10 wt. %, in another embodiment in a range between about 0.1 wt. % and about 6 wt. %, in another embodiment in a range between about 0.5 wt. % and about 5 wt. %, and in still another embodiment in a range between about 1 wt. % and about 5 wt. % based on the weight of resorcinol arylate-comprising polymer in a coating layer. An auxiliary UV screener may be combined with coating layer using known methods. In one embodiment auxiliary UV screener is at least partially dissolved in a solution with components of a coating layer, and a film of coating layer comprising auxiliary UV screener is solvent cast. In another embodiment auxiliary UV screener is at least partially dissolved in a solution and impregnated from said solution into solid or at least partially solid coating layer. In still another embodiment auxiliary UV screener is combined with coating layer in a melt method such as co-extrusion.

The material of the substrate layer in the articles of this invention may be at least one thermoplastic polymer, whether addition or condensation prepared. Condensation polymers include those described hereinabove, including, but are not limited to, polycarbonates, particularly aromatic polycarbonates, polyphenylene ethers, polyetherimides, polyamides, polyesters and polyestercarbonates (other than those employed for the coating layer, as defined hereinafter). Polycarbonates and polyesters may be substrate layers. A substrate layer may additionally contain art-recognized additives including colorants, pigments, dyes, impact modifiers, color stabilizing additives, UV screeners, flame retardants fillers, stabilizers. flow aids, ester interchange inhibitors, and mold release agents.

Suitable polycarbonates include homopolycarbonates comprising structural units of the type described for the organic carbonate blocks in the copolyestercarbonates of the invention. In some embodiments polycarbonates are bisphenol A homo- or copolycarbonates or mixtures thereof. In one embodiment the weight average molecular weight of the initial polycarbonate ranges from about 5,000 to about 100,000; and in another embodiment from about 25,000 to about 65,000.

The polycarbonate substrate may also be a copolyestercarbonate (other than that copolyestercarbonate employed for the coating layer as defined hereinafter). Such copolymers typically comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include polyethylene, polypropylene, thermoplastic polyolefin ("TPO"), poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. In particular embodiments addition polymers are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described condensation polymers and/or addition polymers constitute in various embodiments the major proportion thereof.

The substrate layer in the multilayer articles of this invention may also comprise at least one of any thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. In many embodiments the interlayer is optically transparent in nature and generally has optical transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

Also present in the articles of the invention is at least one coatings layer comprising at least one polymer comprising structural units derived from at least one 1,3-dihydroxybenzene moiety and at least one aromatic dicarboxylic acid moiety prepared by methods embodied in the present invention. In various embodiments, suitable coating layers comprise polymers comprising thermally stable resorcinol arylate polyester chain members. In other embodiments suitable coating layers comprise resorcinol arylate polyesters, copolyesters (particularly those containing soft-blocks), copolyestercarbonates, and mixtures thereof. Copolyestercarbonates, when used in both substrate layer and in coating layer, are different from each other in molecular structure. In some embodiments, for example when the coating layer contains copolyestercarbonate with resorcinol arylate polyester blocks, then any ester blocks in the substrate copolyestercarbonate layer will typically be derived from the same divalent organic radical as contained in the carbonate blocks.

It is also within the scope of the invention for other polymers to be present which are miscible in at least some proportions with a polymer coating layer comprising at least one thermally stable polymer comprising structural units derived from at least one 1,3-dihydroxybenzene moiety and at least one aromatic dicarboxylic acid moiety. Illustrative examples of at least partially miscible polymers include polyetherimide and polyesters such as PBT, PET, PTT, PEN, PBN, PETG, PCCD, and bisphenol A polyarylate. In some embodiments the coating layer polymer consists essentially of thermally stable resorcinol arylate polyesters, copolyesters, or copolyestercarbonates.

Another aspect of the invention is a method for preparing a multilayer article which comprises applying at least one thermally stable coating layer to a second layer, said second layer comprising at least one thermoplastic polymer, thermoset polymer, cellulosic material, glass, or metal, and said coating layer comprising at least one polymer comprising structural units derived from at least one 1,3-dihydroxybenzene moiety and at least one aromatic dicarboxylic acid moiety, the polymer being substantially free of anhydride linkages linking at least two mers of the polymer chain.

In one embodiment of the invention, at least one thermally stable coating layer is applied to a second layer, which may be the substrate layer or at least one intermediate layer ultimately to be disposed between the coating and substrate layers. An intermediate layer may generally comprise any of the materials suitable for use as the substrate or coating layer, and may further contain fillers and colorants such as described hereinabove. When necessary, it may be specifically chosen so as to provide good adhesion between substrate and coating layers. Colorants of the previously described types may also be present in the coating layer or in any intermediate layer, or in both coating layer and any intermediate layer. In other embodiments an adhesive layer may be present between any two layers in the multilayer article.

In some embodiments application of the at least one coating layer may be performed by solvent-casting. In other embodiments application of said coating layer comprises fabrication of a separate sheet thereof followed by application to a second layer, or by simultaneous production of both layers, typically in a melt process using methods known in the art. Thus, there may be employed such illustrative methods as co-injection molding, thermoforming, coextrusion, overmolding, blow molding, multi-shot injection molding and placement of a film of the coating layer material on the surface of a second layer followed by adhesion of the two layers, typically in an injection molding apparatus; e.g., in-mold decoration, or in a hot-press. These operations may be conducted under art-recognized conditions.

It is also within the scope of the invention to apply a structure comprising the coating layer and the second layer to a third, substrate layer, which is generally of a thermoplastic, thermoset, or cellulosic material similar or identical to that of the second layer but different from that of the coating layer. This may be achieved, for example, by charging an injection mold with the structure comprising the coating layer and the second layer and injecting the substrate sheet material behind it. By this method, in-mold decoration and the like are possible. Both sides of the substrate layer may receive the other layers. In particular embodiments other layers are applied to only one side of substrate layer. In other embodiments it is also within the scope of the invention to apply a structure comprising the coating layer and the second layer to a third, substrate layer, which is generally a metal, optionally with the addition of at least one adhesive interlayer between any two layers in the multilayer article.

The thicknesses of the various layers in multilayer articles of this invention are most often as follows:

substrate—in one embodiment at least about $125\mu$ (microns), in another embodiment at least about $250\mu$, in still another embodiment at least about $400\mu$, coating—in one embodiment about 2–2,500, in another embodiment about 10–250 and in still another embodiment about 50–175$\mu$.

second material, if any—in one embodiment about 2–2,500, in another embodiment about 10–250, and in still another embodiment about 50–175$\mu$, total—in one embodiment at least about $125\mu$, in another embodiment at least about $250\mu$, in still another embodiment at least about $400\mu$.

The articles of this invention are typically characterized by the usual beneficial properties of the substrate layer, in addition to weatherability. In various embodiments weatherability may be evidenced by such properties as improved initial gloss, improved initial color, improved resistance to ultraviolet radiation and maintenance of gloss, improved impact strength, and resistance to organic solvents encountered by the articles in their final applications. Depending upon such factors as the coating layer/substrate combination, the multilayer articles may possess recycling capability, which makes it possible to employ the regrind material as a substrate for further production of articles of the invention.

Multilayer articles which can be made which comprise thermally stable polymers comprising resorcinol arylate polyester chain members include aircraft, automotive, truck, military vehicle (including automotive, aircraft, and waterborne vehicles), scooter, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor-vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the, work that contributes to the teaching of the present application. Accordingly, these examples are not intended to limit the invention, as defined in the appended claims,in any manner.

In the following examples all parts are by weight unless otherwise designated. Molecular weight values for polymeric samples were determined by gel permeation chromatography (GPC) using 3% isopropanol/chloroform eluent at 0.75 milliliters (ml) per minute (min) on a Polymer Labs Mixed C size exclusion column held at 35° C., and calibrated using polystyrene standards, and analyzed with Turbogel software.

EXAMPLE 1

This example illustrates the preparation of a thermally stable resorcinol arylate polyester with both iso- and terephthalate units. To a one liter, five neck, Morton flask blanketed with nitrogen and equipped with a mechanical stirrer, pH electrode, reflux condenser, two pressure equalizing addition funnels, was charged resorcinol (21.8 grams [g]; 0.198 moles [mol]), resorcinol monobenzoate capping agent (1.07 g; 2.5 mole %), triethylamine (0.274 ml; 1 mole %), dichloromethane (150 ml), and water (100 ml). One addition funnel was charged with sodium hydroxide pellets (16.84 g; 0.42 mol) and water (32 ml), while a solution of isophthaloyl dichloride (20.3 g; 0.1 mol), terephthaloyl dichloride (20.3 g; 0.1 mol), and dichloromethane (150 ml) was added to the second. The pH of the reaction mixture was adjusted to 7.5 with sodium hydroxide prior to the addition of acid chloride solutions, which were added over 6 minutes. The pH of the reaction was maintained between 7.25 and 7.75 for the first ten minutes of reaction. At 11 minutes the reaction the pH was raised to about 10 with the addition of sodium hydroxide and held for an additional 10 minutes. The stirring was stopped and the aqueous layer was removed. The resulting gray organic layer was washed with In hydrochloric acid, 0.1N hydrochloric acid, water (three times), and the polymer isolated by precipitation into boiling water yielding a white, fibrous material which was dried in vacuum at 110° C. overnight. The isolated polymer was the desired resorcinol arylate polyester.

Control Example 1

A polyester of resorcinol with a mixture of iso- and terephthalate was prepared in a blender according to the interfacial method of U.S. Pat. No. 3,460,961. The Isolated polymer had weight average molecular weight of about 289,000. The procedure was modified by addition of 4 mole % chain-stopper (phenol), resulting in polymer with weight average molecular weight of about 51,000.

Control Example 2

A polyester of resorcinol with a mixture of iso- and terephthalate was prepared according to the solution method of Cohen et al., Journal of Polymer Science: Part A-1, vol. 9,3263–3299 (1971). To a one-liter, three neck, round bottomed flask equipped with a mechanical stirrer and an addition funnel were charged isophthaloyl dichloride (5.076 g, 25 millimoles [mmol]), terephthaloyl dichloride (5.076 g, 25 mmol), resorcinol (5.506 g, 50 mmol), and tetrahydrofuran (200 ml) dried by distillation from sodium and benzophenone. Polymerization was initiated by dropwise addition of a stoichiometric amount of triethylamine (10.12 g, 100 mmol) over 30 minutes. The mixture then was stirred for 3 hours at room temperature. Triethylamine hydrochloride was removed from the reaction mixture by filtration. The filtrate was slowly poured into methanol (500 ml) in a blender. The precipitated polymer was washed with hot water and dried in a vacuum oven. The isolated polymer had weight average molecular weight of about 47,000.

EXAMPLES 2–11

These examples illustrate the preparation of hydroxy-terminated resorcinol iso/terephthalate oligomers. Into a 1 liter Morton flask equipped with a mechanical stirrer, pH electrode, condenser, and two addition tubes connected to metering pumps were charged resorcinol (12.11 g, 0.11 mol), water (18 ml), dichloromethane (200 ml), and triethylamine (140 to 560 microliters, 1 to 4 mol % based on acid chlorides). The mixture was stirred at 500 rpm. A two-step addition profile was used for the delivery of acid chloride solution and base solution. In the first step, a majority of base (60 to 80% out of total base amount of 17.5 ml of 33% aqueous sodium hydroxide solution) and the whole acid chloride solution (70 ml solution of isophthaloyl dichloride (10.15 g, 0.05 mol) and terephthaloyl dichloride (10.15 g, 0.05 mol) in dichloromethane) were added at constant rates, and the remaining base was added in the second step at continuously decreasing rate. The base was pumped from graduated burettes and the amount was checked every 30 seconds in order to control the-stoichiometry. The pH varied between-about 3.5 and about 8. The length of the first step was varied from 7 to 13 minutes with the total step 1 and step 2 time constant at 25 minutes. The reaction mixture was further stirred for 30 minute total reaction time. The reaction conditions and weight average molecular weights of the isolated polymers are shown in Table 1.

TABLE I

| Example | % Base Added in 1st Step | Base Addition time (min.) | mol % triethylamine | Oligomer MW[a] |
|---|---|---|---|---|
| 2 | 60 | 7 | 1 | 27.3 |
| 3 | 60 | 7 | 4 | 26.9 |
| 4 | 60 | 13 | 4 | 24.5 |
| 5 | 60 | 13 | 1 | 26 |
| 6 | 70 | 10 | 2.5 | 28.3 |
| 7 | 70 | 10 | 2.5 | 23 |
| 8 | 80 | 7 | 4 | 28.4 |
| 9 | 80 | 7 | 1 | 30.8 |
| 10 | 80 | 13 | 4 | 29.5 |
| 11 | 80 | 13 | 1 | 30.4 |

[a]times $10^{-3}$

A sample of each polymer was analyzed for anhydride content by treatment in solution with diisobutylamine. Polymers prepared using 4 mol % triethylamine showed greater than 95% retention of weight average molecular weight.

EXAMPLES 12–28

The procedure of Examples 2–11 was repeated except that in some experiments 13 to 15 mol % total excess of resorcinol was used. In some experiments a small amount of capping agent (1 mol % phenol) was added. In some cases, the reaction mixture was heated externally to a refluxing point at 3 minutes. The reaction conditions and weight average molecular weights of the isolated polymers are shown in Table 2.

TABLE 2

| Example | mol % triethylamine | Comments[a] | Reflux[b] | Initial Mw[c] | % Mw Retention[d] |
|---|---|---|---|---|---|
| 12 | 4 | 1% PhOH | Y | 19.5 | 99 |
| 13 | 4 | 15% excess Rs | N | 19.9 | 100 |
| 14 | 4 | 0.5% PhOH | N | 21.6 | 99.5 |
| 15 | 4 | 15% excess Rs | Y | 21.8 | 96.6 |
| 16 | 4 | 1% PhOH | N | 21.9 | 99.3 |
| 17 | 4 | 1% PhOH | Y | 22.2 | 97.7 |
| 18 | 4 |  | N | 22.3 | 96.1 |
| 19 | 4 | 13% excess Rs | N | 22.4 | 97.7 |
| 20 | 4 | 1% PhOH | Y | 22.4 | 96.4 |
| 21 | 4 | 1% PhOH | Y | 22.5 | 93 |
| 22 | 4 | 1% PhOH | N | 22.7 | 97.8 |
| 23 | 4 | 0.5 PhCOCl | N | 24.6 | 99 |
| 24 | 2.5 | 1% PhOH | Y | 24.7 | 97.2 |
| 25 | 4 |  | N | 24.8 | 96.7 |
| 26 | 4 |  | Y | 25.3 | 98 |

TABLE 2-continued

| Example | mol % triethylamine | Comments[a] | Reflux[b] | Initial Mw[c] | % Mw Retention[d] |
|---|---|---|---|---|---|
| 27 | 4 | | N | 26.6 | 97.7 |
| 28 | 3 | | Y | 30.3 | 100 |

[a]PhOH (phenol); Rs (resorcinol); PhCOCl (benzoyl chloride)
[b]Y (Yes); N (No)
[c]times $10^{-3}$
[d]following treatment with diisobutylamine in solution

EXAMPLES 29–46

The procedure of Examples 2–11 was repeated except that a portion of tertiary amine was added following addition of dicarboxylic acid dichloride to resorcinol moiety. A total of 4 mol % tertiary amine (40000 ppm; based on moles acid chlorides) was added. The reaction conditions and weight average molecular weights of the isolated polymers are shown in Table 3. Example 46 is a control experiment in which all the tertiary amine was present at the beginning of the reaction before addition of dicarboxylic acid dichloride to resorcinol moiety

TABLE 3

| Example | % Base Added in 1st Step | Base Addition time (min.) | TEA added initially (ppm) | Initial Mw[a] | % Mw Retention[b] |
|---|---|---|---|---|---|
| 29 | 80 | 7 | 50 | 29.3 | 96.5 |
| 30 | 80 | 7 | 10 | 23.1 | 86.8 |
| 31 | 80 | 7 | 10 | 22.2 | 98.5 |
| 32 | 80 | 7 | 50 | 29.4 | 97.4 |
| 33 | 96 | 7 | 10 | 32.7 | 94.3 |
| 34 | 96 | 7 | 50 | 34.4 | 92.5 |
| 35 | 88 | 10 | 30 | 26.5 | 99.4 |
| 36 | 88 | 10 | 30 | 25.6 | 101 |
| 37 | 80 | 13 | 50 | 25.9 | 95.9 |
| 38 | 80 | 13 | 10 | 25.2 | 96.6 |
| 39 | 96 | 13 | 50 | 29.4 | 90.2 |
| 40 | 96 | 13 | 10 | 22.14 | 98.59 |
| 41 | 96 | 13 | 50 | 26.7 | 92.93 |
| 42 | 96 | 13 | 10 | 23.6 | 90.5 |
| 43 | 96 | 16 | 10 | 21.6, 22.0 | 98.8, 98.0 |
| 44 | 96 | 19 | 10 | 24.1, 22.3 | 95.9, 97.3 |
| 45 | 64 | 7 | 10 | 21.46, 23.31 | 96.3, 100 |
| 46 | 96 | 16 | 40000 | 24.7, 23.1 | 92.7, 94.4 |

[a]times $10^{-3}$
[b]following treatment with diisobutylamine in solution

EXAMPLE 47

This example illustrates the preparation of a thermally stable resorcinol iso/terephthalate-block-copolycarbonate beginning with the preparation of hydroxy-terminated resorcinol iso/terephthalate oligomer. To a thirty liter glass reactor equipped with a glass impeller, centrifugal recirculation pump, reflux condenser and pressure-equilibration addition funnel were charged resorcinol (605.6 g, 5.5 mol), methyl-tributylammonium chloride (82.5 g of a 75% wt. aqueous solution; 0.275 mol), dichloromethane (6.5 liters), and water (2.5 liters). The recirculation pump was turned cn and the mixture was degassed with nitrogen while stirring. The pH of the aqueous phase was adjusted to 7 with 50% aqueous sodium hydroxide solution. Reaction was carried out by adding a solution of acid chlorides (507.5 g each of iso- and terephthaloyl dichlorides; 5.00 moles total in 2.0 liters of dichloromethane solution) while stirring- and simultaneously adding 50% sodium-hydroxide solution at such a rate that the-pH was maintained between 6 and 8. The acid chlorides were added using a three-step program with the rate of addition declining with each step. A timer. was started at the beginning of acid chloride addition. The pH was maintained at 8 while adding acid chlorides over 8 minutes using the following protocol: 40% of total acid chlorides was added over the first 2 minutes; 30% of total was added over the next 2 minutes; the remaining 30% of total was added over the next 4 minutes. The recirculation loop was running during the entire time.

Following complete addition of acid chlorides, the pH was slowly raised to 11–12 over two to three minutes, and the reaction mixture was stirred for 10 minutes. The polymer formed was a hydroxy-terminated oligomer with weight average molecular weight (Mw) of approximately 20,000.

Bisphenol A (1102 g, 4.83 mol), dichloromethane (4.0 liters), triethylamine (17 ml, 0.12 mol), p-cumyl phenol capping agent (60 g), and water (6.0 liters) were then added and the recirculation loop was turned on. Phosgene was introduced at pH 7.5–8.5, then increasing slowly to pH 10–10.5 using a 15% excess over the theoretical amount of phosgene.

The reaction mixture was separated, the organic phase washed with 1N hydrochloric acid, 0.1N hydrochloric acid, and twice with water, and the polymer was isolated by precipitation in methanol. The polymer obtained was the desired resorcinol iso/terephthalate-co-BPA polycarbonate copolymer.

EXAMPLES 48–61

Samples of polymers comprising resorcinol arylate polyester chain members were dried in vacuo at 120° C. for 15 hrs. A weighed sample of about 25–30 milligrams was placed in a circular die cavity 2 centimeters (cm.) In diameter and covered with a cylindrical piston of the same size. The die assembly containing the sample was heated in a Carver press at 290° C. for 5 minutes at 500–4,000 pounds gauge (lbs.g.) pressure, then removed and cooled in chill blocks. The heat treatment produced a film about 1 mil in thickness and 2 cm. In diameter. Molecular weights of samples before and after the heat treatment were measured by GPC using polystyrene standards. Table 4 shows examples of melt stability for resorcinol arylate polyesters prepared using the method of Example 1 and Control Examples 1 and 2, and for resorcinol arylate-containing copolyestercarbonates prepared using the method of Example 47. Wt. % resorcinol arylate in the Table refers to wt. % resorcinol arylate chain members in the polymer, the remaining mers being organic carbonate mers.

TABLE 4

| Example | wt. % resorcinol arylate | % Mw Retention, melt test | % Mw Retention, amine test[f] |
|---|---|---|---|
| 48[a] | 50 | 89.4 | 98 |
| 49[a] | 80 | 84 | 97.9 |
| 50[a] | 50 | 84.8 | 94 |
| 51[b] | 50 | 98.8 | 99.5 |
| 52[b] | 35 | 98.7 | 99.3 |
| 53[a] | 100 | 55 | 62 |
| 54[a] | 100 | 55.9 | 61 |
| 55[a] | 100 | 45 | 40 |

TABLE 4-continued

| Example | wt. % resorcinol arylate | % Mw Retention, melt test | % Mw Retention, amine test[f] |
|---|---|---|---|
| 56[b] | 100 | 87.5 | 86 |
| 57[b] | 100 | 97.7 | 99.6 |
| 58[b] | 100 | 99.5 | 99 |
| 59[c] | 100 | 12 | 25 |
| 60[d] | 100 | 46 | 74 |
| 61[e] | 100 | 77 | 78 |

[a]final reaction mixture stirred 5 min at pH 10
[b]final reaction mixture stirred 20 min at pH 10–12
[c]Control Example 1
[d]Control Example 1 using 4 mole % phenol chain-stopper
[e]Control Example 2
[f]following treatment with diisobutylamine in solution

EXAMPLE 62

A resorcinol arylate polyester was prepared by the interfacial method of Control Example 1 except that the organic solvent was dichloromethane and a capping agent was present. Extrusion of the material gave orange pellets. The polymer had initial weight average molecular weight (Mw) of 61,300 and Mw after extrusion of 52,200 (85% retention). A separate sample of material was treated with dibutylamine in solution; the Mw of the recovered material was 42,400 (69% retention).

EXAMPLE 63

A resorcinol arylate polyester was prepared by the method of Example 1. Extrusion of the material gave yellowish pellets. The polymer had initial Mw of 53,600 and Mw after extrusion of 50,800 (95% retention). A separate sample of material was treated with dibutylamine in solution; the Mw of the recovered material was 48,400 (90% retention).

EXAMPLE 64

A resorcinol arylate-containing block copolyestercarbonate with 50% by weight carbonate blocks and 1:1 ratio of isophthalate to terephthalate in the resorcinol arylate blocks was prepared by the method Example 47 except that the resorcinol arylate-containing polyester block was made using the procedure of Control Example 1 using a capping agent and dichloromethane as the organic solvent. Extrusion of the material gave amber pellets. The copolymer had initial Mw of 75.900 and Mw after extrusion of 64,500 (85% retention). A separate sample of material was treated with dibutylamine in solution; the Mw of the recovered material was 73,000 (96% retention).

EXAMPLE 65

A resorcinol arylate-containing block copolyestercarbonate was prepared by the method of Example 47 with 50% by weight carbonate blocks and 1:1 ratio of isophthalate to terephthalate in the resorcinol arylate blocks. Extrusion of the material gave faintly yellowish pellets. The copolymer had initial Mw of 52,300 and Mw after extrusion of 51,700 (99% retention). A separate sample of material was treated with dibutylamine in solution; the Mw of the recovered material was 51,500 (98% retention).

Disks were formed from the resorcinol arylate-containing polymers of Examples 62–65. The disks were approximately 0.6 millimeters (mm) (0.024 inches) thick and 50 mm (2.0 inches) diameter, and were formed from melt-processed polymer (either pellets, extruded film, or injection molded parts) under the following conditions: 2.1 g of melt-processed polymer were placed in a mold between heated platens of a hydraulic press and heated at about 200° C. with no applied pressure for 3 minutes, then under 4500 lbs. gauge pressure for 1 minute, and finally under 6500 lbs. gauge pressure for 1 minute. The mold was then rapidly cooled in ice water and opened to remove the disk.

The disks prepared as described were laminated onto injection-molded plaques of LEXAN 140 polycarbonate (from General Electric Plastics) containing 2 wt. % of titanium dioxide pigment under the following conditions to make well-adhered multilayer articles. All materials were placed in a heated (60° C.) vacuum desiccator overnight. A disk was placed onto an injection molded plaque of polycarbonate 2.5 inches square and one-eighth inch thick in a mold between heated platens of a hydraulic press and heated at about 200° C. with no applied pressure for 2 minutes, then under 4500 lbs. gauge pressure for 1 minute, and finally under 6500 lbs. gauge pressure for 1 minute. All samples were well adhered.

The color of the disks and of the laminated plaques was determined on a GretagMacbeth™ Color-Eye 7000A colorimeter and reported as CIELAB values and yellowness index (YI; according to ASTM D1925). Results are shown on Table 5.

TABLE 5

| | Disks (transmission) | | | | Laminate on PC (reflection) | | | |
|---|---|---|---|---|---|---|---|---|
| Example | L* | a* | b* | YI | L* | a* | b* | YI |
| 62 | 90.45 | −1.23 | 15.2 | 26.01 | 76.6 | 3.57 | 31.74 | 61.07 |
| 63 | 94.73 | −0.3 | 3.61 | 6.34 | 86.18 | −0.38 | 14.95 | 27.4 |
| 64 | 93.82 | −0.43 | 5.4 | 9.5 | 84.21 | 0.88 | 20.44 | 38.27 |
| 65 | 95.52 | −0.11 | 1.31 | 2.26 | 91.21 | −0.8 | 6.95 | 12 |
| unlaminated PC | | | | | 94.86 | −0.52 | 2.88 | 4.51 |

The data show that the disks and multilayer articles formed from melt-processed resorcinol arylate-containing polymers made by a method of the invention have much less color and lower yellowness index than the respective control blends.

EXAMPLES 66–67

Resorcinol solutions were prepared by dissolving 1600 grams resorcinol and 200 ml. deoxygenated water containing 4 ml. gluconic acid solution (about 50 wt. % solution in water) in a vessel made of 316 stainless steel. The vessel was closed and a slight nitrogen purge through the solution was started (about 8 scfm). The vessel was held 90° C. Samples were taken with time. A UV-VIS spectra was taken of the sample and the area under the curve from 400 nm to 600 nm was measured. The values at various times were divided by the value at time zero to calculate a relative color. A control experiment was performed under similar conditions using resorcinol water without added acid. Comparative data are shown in Table 6.

TABLE 6

| Example 66 Control solution with no acid added | | Example 67 Solution with acid added | |
|---|---|---|---|
| Time | Relative Color | Time | Relative Color |
| 0 | 1.0 | 0 | 1.0 |
| 18 | 1.2 | 14 | 1.0 |
| 27 | 2.9 | 24 | 1.0 |
| 42 | 5.0 | 40 | 0.9 |
| 51 | 7.6 | 47 | 1.0 |
| 68 | 6.6 | 69 | 0.8 |
| 74 | 7.7 | 89 | 0.9 |
| 164 | 5.6 | 137 | 0.8 |

The data show that Example 66 without added acid developed higher level of color than Example 67 which contained added acid.

EXAMPLES 68–71

Solutions of resorcinol were prepared by dissolving 45 grams resorcinol in 55 grams of deoxygenated water. Acid was added to each resorcinol solution. Samples were removed with time and the absorbance at 470 nm was measured as an indication of color formation. A control experiment was run under similar conditions with no added acid. Comparative data are shown in Table 7. p-TSA is para-toluene sulfonic is a sulfonic acid-functionalized ion exchange resin.

TABLE 7

| | Acid used | | Absorbance at 470 nm with time (hrs.) | | |
|---|---|---|---|---|---|
| Example # | type | amount | 24 | 48 | 120 |
| 68 | none | — | 0.0339 | 0.0599 | 0.0967 |
| 69 | conc. HCl | 50 µl | 0.0192 | 0.0138 | 0.0150 |
| 70 | p-TSA | 0.05 g | 0.0095 | 0.0170 | 0.0242 |
| 71 | IER | 0.2 g | 0.0245 | 0.0129 | 0.0118 |

The data show that Example 69 without added acid developed higher level of an Examples 69–71 which contained added acid.

EXAMPLES 72–83

Solutions of resorcinol were prepared by dissolving 45 grams resorcinol in 55 grams of deoxygenated water. Acid was added to each resorcinol solution. Samples were removed with time and the absorbance at 470 nm was measured as an indication of color formation. A control experiment was run under similar conditions with no added acid. Comparative data are shown in Table 8. The abbreviation "glu. acid" is d-gluconic acid, while "S.S." is stainless steel.

TABLE 8

| | Acid used | | | Absorbance at 470 nm with time (hrs.) | | | | pH at 1008 |
|---|---|---|---|---|---|---|---|---|
| Example # | container | type | amt. (ppm) | 24 | 48 | 144 | 1008 | hrs. |
| 72 | glass | none | — | 0.0253 | 0.0310 | 0.0073 | 0.453 | 3.65 |
| 73 | glass | HCl | 220 | 0.0159 | 0.0165 | 0.0049 | 0.0315 | 1.72 |
| 74 | glass | glu. acid | 290 | 0.0335 | 0.0179 | 0.0575 | 0.38 | 2.98 |
| 75 | glass | glu. acid | 290 | 0.0233 | 0.0134 | 0.0140 | 0.356 | 2.99 |
| 76 | glass | glu. acid | 1160 | 0.0253 | 0.0175 | 0.0106 | 0.301 | 2.81 |
| 77 | glass | glu. acid | 1160 | 0.0226 | 0.0197 | 0.0145 | 0.172 | 2.8 |
| 78 | glass | glu. acid | 2900 | 0.0160 | 0.0196 | 0.0199 | 0.141 | 2.71 |
| 79 | glass | glu. acid | 8700 | 0.0351 | 0.0328 | 0.0343 | 0.078 | 2.61 |
| 80 | 316 S.S. | none | — | 0.0152 | 0.0366 | 0.2016 | — | — |
| 81 | 316 S.S. | glu. acid | 290 | 0.0195 | 0.0135 | 0.0860 | — | — |
| 82 | 316 S.S. | glu. acid | 1160 | 0.0220 | 0.0138 | 0.0618 | — | — |
| 83 | 316 S.S. | glu. acid | 2890 | 0.0510 | 0.0146 | 0.0270 | — | — |

The data show that Examples 72 and 80 without added acid developed higher level of color than the other examples which contained added acid. The data also show that acid levels which provide a pH of below about 3 are effective for suppressing color development.

EXAMPLES 84–87

Solutions of resorcinol were prepared by dissolving 58.5 grams resorcinol in 71.5 grams of water. The water was sparged for 15 minutes with nitrogen before addition of resorcinol. Acid was added to each resorcinol solution. The samples were examined after 5 days for color formation. Sparging with nitrogen was continued over the 5 day test period. A control experiment was run under similar conditions with no added acid. Comparative data are shown in Table 9. The abbreviation "S.S." is stainless steel.

TABLE 9

| | | Acid used | | Color after 5 |
|---|---|---|---|---|
| Example # | container | type | amount (ppm) | days |
| 84 | 316 S.S. | none | — | dark |
| 85 | 316 S.S. | HCl | 220 | colorless |
| 86 | 316 S.S. | acetic | 500 | colorless |
| 87 | 316 S.S. | phosphoric | 700 | colorless |

The data show that Example 84 without added acid developed higher level of color than Examples 85–87 which contained added, acid.

EXAMPLES 88–100

Solutions of resorcinol were prepared by dissolving 40 grams resorcinol in 60 grams of water in glass containers. Deionized, deoxygenated water was used except of those samples comprising recycle water or comprising sulfuric acid. Acid was added to certain resorcinol solutions. Other samples comprised deoxygenated recycle water as noted. Recycle water was water recovered from washing a solution of bisphenol A polycarbonate comprising triethylamine in dichloromethane with an aqueous solution comprising hydrochloric acid. Recycle water comprised triethylamine hydrochloride and sodium chloride, and had a pH in a range of between about 1.0 and about 1.6. Samples were removed with time and the absorbance at 470 nm was measured as an indication of color formation. Control experiments (Examples 99 and 100) were run in deionized, deoxygenated water with no added acid. Comparative data are shown in Table 10.

TABLE 10

Absorbance at 470 nm with time

| | Example # | | | | | | | | | | | | |
|---|---|---|---|---|---|---|---|---|---|---|---|---|---|
| | 88 | 89 | 90 | 91 | 92 | 93 | 94 | 95 | 96 | 97 | 98 | 99 | 100 |
| Additive | glu. acid 0.250 µL | glu. acid 0.250 µL | glu. acid 0.750 µL | none; recycle water used | none; recycle water used | none; recycle water used | HCl 50 µl | HCl 50 µl | 4N $H_2SO_4$ 150 µL | 4N $H_2SO_4$ 151 µL | 4N $H_2SO_4$ 151 µL | none | none |
| Time (hrs.) | | | | | | | | | | | | | |
| 0 | 0.0118 | 0.0144 | 0.0114 | 0.0119 | 0.0118 | 0.0128 | 0.0103 | 0.0109 | 0.0152 | 0.0126 | 0.0102 | 0.0191 | 0.0186 |
| 22 | 0.0117 | 0.0155 | 0.0093 | 0.0097 | 0.0119 | 0.0111 | 0.0109 | 0.0102 | 0.0208 | 0.0195 | 0.0113 | 0.0606 | 0.0663 |
| 47 | 0.0119 | 0.0118 | 0.0100 | 0.0168 | 0.0173 | 0.0069 | 0.0080 | 0.0074 | 0.0266 | 0.0375 | 0.0071 | 0.0952 | 0.0893 |
| 71 | 0.0274 | 0.0235 | 0.0084 | 0.0096 | 0.0140 | 0.0102 | 0.0086 | 0.0093 | 0.0641 | 0.0723 | 0.0075 | 0.110 | 0.109 |
| 214 | 0.0838 | 0.0730 | 0.0092 | 0.0129 | 0.0218 | 0.0159 | 0.0232 | 0.0226 | 0.119 | 0.105 | 0.0418 | 0.219 | 0.220 |

The data of Table 10 show that Examples 99 and 100 without added acid developed higher level of color than the other examples which contained added acid. The data also show that a recycle water stream which had been previously used to treat a base-containing solution and which comprised a salt was effective for suppressing color development.

EXAMPLES 101–103

Resorcinol arylate-containing block copolyestercarbonates are prepared as described in any of Examples 12–28 with either 20%, 50%, or 80% by weight carbonate blocks and 1:1 ratio of isophthalate to terephthalate in the resorcinol arylate blocks. The resorcinol which is employed in each synthesis is added as a solution in recycle water as described in Examples 91–93, said solution having a pH of about 3 or less. The recycle water is analyzed for triethylamine-comprising species. If necessary, additional triethylamine or triethylamine hydrochloride is added to the recycle water or the recycle water is diluted with additional water to adjust the concentration of triethylamine so that the total amount of triethylamine added to the reaction mixture is derived from the recycle water without needing to add any triethylamine separately The product copolyestercarbonates are lighter in color than comparable copolyestercarbonates made using triethylamine and resorcinol which is prepared as an aqueous solution in untreated water.

EXAMPLES 104–106

Resorcinol arylate-containing block copolyestercarbonates are prepared as described in any of Examples 29–45 with either 20%, 50%, or 80% by weight carbonate blocks and 1:1 ratio of isophthalate to terephthalate in the resorcinol arylate blocks. The resorcinol which is employed in each synthesis is added as a solution in recycle water, said solution having a pH of about 3 or less. The recycle water is derived from washing an organic solution comprising a condensation polymer and an alkali metal halide. The product copolyestercarbonates are lighter in color than comparable copolyestercarbonates made using resorcinol which is prepared as an aqueous solution in untreated water.

EXAMPLES 107–109

Resorcinol arylate-containing block copolyestercarbonates are prepared as described in Example 47 with either 20%, 50%, or 80% by weight carbonate blocks and 1:1 ratio of isophthalate to terephthalate in the resorcinol arylate blocks. The resorcinol which is employed in each synthesis is added as a solution in recycle water, said solution having a pH of about 3 or less. The recycle water is water recovered from washing an organic solution comprising a condensation polymer and an ammonium salt phase transfer catalyst with an aqueous solution comprising hydrochloric acid. The recycle water is analyzed for species comprising ammonium salt phase transfer catalyst. If necessary, additional phase transfer catalyst is added to the recycle water or the recycle water is diluted with additional water to adjust the concentration of phase transfer catalyst so that the total amount of phase transfer catalyst added to the reaction mixture is derived from the recycle water without needing to add any phase transfer catalyst separately. The product copolyestercarbonates are lighter in color than comparable copolyestercarbonates made using phase transfer catalyst and resorcinol which is prepared as an aqueous solution in untreated water.

EXAMPLES 110–121

Into a one liter, five neck Morton flask equipped with a mechanical stirrer, pH electrode, condenser, and two addition tubes connected to metering pumps were charged the following:

(a) resorcinol (between 23.12 grams [g] and 24.22 g, 5–10% molar excess based on stoichiometry with total acid chloride)

(b) water (between 38 g and 66 g, to provide a concentration of 22–30% salts at the end of the oligomerization reaction)

(c) dichloromethane (140 milliliters [ml])

(d) phenol (0.873 g)

(e) triethylamine (between 0.28 ml and 0.836 ml, 1–3 mol % based on total acid chloride)

The % salts calculation is based on total amount of salt formed in the reaction divided by the amount of total water added initially plus water added with sodium hydroxide solution. One addition tube was connected to an acid chloride solution consisting of 40.6 g of a 50/50 mixture of isophthaloyl dichloride and terephthaloyl dichloride and 60 ml of dichloromethane. The other addition tube was connected to a 50 wt % aqueous sodium hydroxide solution. The mixture was stirred, and over the course of 15 minutes the acid chloride solution and between 28.8 g and 31.36 g (90–98% of stoichiometry based on total acid chloride) of the sodium hydroxide solution were added simultaneously at constant flow rates to the reactor. Upon completion of the acid chloride addition, a further amount of sodium hydroxide solution was added to the reactor over about 3 minutes in order to adjust the pH to a value in a range between about 7 and about 9, and the mixture was allowed to stir for about 10 minutes at this pH. Samples were taken and analyzed for oligomer weight average molecular weights (Mw) by gel permeation chromatography (GPC) versus polystyrene standards. The data are reported in Table 11.

about 8 can be achieved with ratios of sodium hydroxide to total acid chloride in the range of 90–98%.

EXAMPLE 122

Into a one liter, five neck Morton flask equipped with a mechanical stirrer, pH electrode, condenser, and two addition tubes connected to metering pumps were charged resorcinol (29.18 g), water (46 g), dichloromethane (256 g), phenol (0.95 g), and triethylamine (0.5 g). One addition tube was connected to an acid chloride solution consisting of 48.9 g of a 50/50 mixture of isophthaloyl dichloride and terephthaloyl dichloride and 90.8 g of dichloromethane. The other addition tube was connected to a 50 wt % aqueous sodium hydroxide solution. The mixture was stirred, and over the course of 15 minutes the acid chloride solution and 36.6 g of the sodium hydroxide solution were added simultaneously at constant flow rates to the reactor, corresponding to approximately a 95% stoichiometric ratio of sodium hydroxide to total acid chloride. Upon completion of the acid chloride addition, a further 1.9 g of sodium hydroxide solution was added to the reactor over approximately 2 minutes in order to adjust the pH to approximately 7.9, and the mixture was allowed to stir for about 10 minutes at this

TABLE 11

| Ex. # | Water (% NaCl at end) | Mixing (rpm) | NaOH ratio | Excess Resorcinol | end pH | % TEA | Mw ($\times 10^{-3}$) |
|---|---|---|---|---|---|---|---|
| 110 | 30 | 500 | 90 | 5 | 7 | 3 | 18.8 |
| 111 | 22 | 500 | 98 | 5 | 7 | 1 | 23.1 |
| 112 | 26 | 350 | 94 | 7.5 | 8 | 2 | 22.4 |
| 113 | 26 | 350 | 94 | 7.5 | 8 | 2 | 24.3 |
| 114 | 22 | 500 | 90 | 5 | 9 | 3 | 24.8 |
| 115 | 26 | 350 | 94 | 7.5 | 8 | 2 | 21.7 |
| 116 | 30 | 500 | 90 | 10 | 7 | 1 | 17.3 |
| 117 | 22 | 500 | 90 | 10 | 9 | 1 | 19.9 |
| 118 | 30 | 500 | 98 | 10 | 9 | 3 | 18.1 |
| 119 | 26 | 350 | 94 | 7.5 | 8 | 2 | 22.8 |
| 120 | 30 | 500 | 98 | 5 | 9 | 1 | 23.6 |
| 121 | 22 | 500 | 98 | 10 | 7 | 3 | 25.0 |

The PH profiles achieved by the use of these NaOH: acid chloride ratios are shown in Table 12. The data at 15 minutes in Table 2 reflect pH before addition of the further amount of sodium hydroxide to adjust the pH to a value in a range between about 7 and about 9.

pH. Samples were taken and analyzed, indicating an oligomer Mw of 19,300 (by GPC versus polystyrene standards) and a carboxylic acid end group level of 676 ppm. This example illustrates that acceptable product may be obtained

TABLE 12

| Ex. # | NaOH ratio | pH at different times (in minutes) | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 110 | 90 | 7.3 | 7.7 | 7.5 | 7.2 | 6.8 | 6.5 | 6.1 | 5.7 | 5.5 | 5.3 | 5.3 | 5.1 | 5.1 | 5.1 | 5.1 | 5.2 |
| 111 | 98 | 7.1 | 7.9 | 7.8 | 7.7 | 7.6 | 7.1 | 6.9 | 6.7 | 6.7 | 6.6 | 6.6 | 6.5 | 6.5 | 6.6 | 6.7 | 7.0 |
| 112 | 94 | 7.3 | 7.9 | 7.8 | 7.6 | 7.4 | 7.3 | 6.8 | 6.5 | 6.3 | 6.0 | 5.8 | 5.8 | 5.9 | 5.9 | 5.9 | 6.1 |
| 113 | 94 | 7.2 | 8.0 | 7.8 | 7.7 | 7.6 | 7.6 | 7.5 | 7.3 | 7.3 | 7.4 | 7.5 | 7.6 | 7.4 | 7.6 | 7.5 | 7.4 |
| 114 | 90 | 7.4 | 8.0 | 7.6 | 7.5 | 7.2 | 6.8 | 6.4 | 6.2 | 6.1 | 5.6 | 5.4 | 5.1 | 5.0 | 5.2 | 5.2 | 5.3 |
| 115 | 94 | 7.2 | 7.7 | 7.6 | 7.5 | 7.3 | 7.1 | 6.9 | 6.8 | 6.6 | 6.5 | 6.3 | 6.0 | 5.8 | 5.8 | 5.7 | 5.8 |
| 116 | 90 | 6.9 | 7.8 | 7.9 | 8.3 | 7.6 | 6.7 | 6.8 | 6.8 | 6.7 | 6.6 | 6.3 | 5.8 | 5.9 | 5.9 | 6.1 | 6.1 |
| 117 | 90 | 7.1 | 7.6 | 8.0 | 7.4 | 7.2 | 6.9 | 6.6 | 6.5 | 6.5 | 6.5 | 6.5 | 6.4 | 6.2 | 6.1 | 6.0 | 6.0 |
| 118 | 98 | 7.4 | 7.7 | 7.6 | 7.4 | 7.3 | 7.1 | 7.0 | 6.7 | 6.5 | 6.2 | 6.1 | 6.0 | 5.8 | 6.1 | 6.8 | 7.0 |
| 119 | 94 | 7.2 | 7.9 | 7.6 | 7.6 | 7.3 | 7.2 | 7.0 | 6.8 | 6.5 | 6.5 | 6.2 | 6.0 | 5.9 | 6.2 | 6.2 | 6.3 |
| 120 | 98 | 7.0 | 7.8 | 7.6 | 7.5 | 7.5 | 7.5 | 7.5 | 7.5 | 7.4 | 7.3 | 7.3 | 7.3 | 7.3 | 7.4 | 7.6 | 7.8 |
| 121 | 98 | 7.2 | 7.6 | 7.9 | 7.8 | 7.7 | 7.6 | 7.5 | 7.5 | 7.3 | 7.1 | 6.8 | 6.6 | 6.6 | 6.6 | 6.5 | 7.5 |

Examples 110–121 illustrate the pH profiles achieved from use of specific ratios of base (illustrated by sodium hydroxide) to total acid chloride. The pH range of about 5 to when the ratio of sodium hydroxide to total acid chloride is 95% of the stoichiometric amount.

EXAMPLE 123

Into a one liter, five neck Morton flask equipped with a mechanical stirrer, pH electrode, condenser, and two addition tubes connected to metering pumps were charged resorcinol (29.18 g), water (46 g), dichloromethane (256 g), phenol (0.95 g), and triethylamine (0.5 g). One addition tube was connected to an acid chloride solution consisting of 48.9 g of a 50/50 mixture of isophthaloyl dichloride and terephthaloyl dichloride and 90.8 g of dichloromethane. The other addition tube was connected to a 50 wt % aqueous sodium hydroxide solution. The mixture was stirred, and over the course of 15 minutes the acid chloride solution and 33.9 g of the sodium hydroxide solution were added simultaneously at constant flow rates to the reactor, corresponding to approximately an 88% stoichiometric ratio of sodium hydroxide to total acid chloride. Upon completion of the acid chloride addition, a further 4.6 g of sodium hydroxide solution was added to the reactor over about 3 minutes in order to adjust the pH to approximately 7.8, and the mixture was allowed to stir for about 10 minutes at this pH. Samples were taken and analyzed, indicating an oligomer Mw of 19,100 (by GPC versus polystyrene standards) and a carboxylic acid end group level of 729 ppm. This example illustrates that acceptable product may be obtained when the ratio of sodium hydroxide to total acid chloride is 88% of the stoichiometric amount.

EXAMPLE 124

Into a one liter, five neck Morton flask equipped with a mechanical stirrer, pH electrode, condenser, and two addition tubes connected to metering pumps were charged resorcinol (29.18 g), water (46 g), dichloromethane (193 ml), phenol (0.95 g), and triethylamine (0.5 g). One addition tube was connected to an acid chloride solution consisting of 48.9 g of a 50/50 mixture of isophthaloyl dichloride and terephthaloyl dichloride and 90.8 g of dichloromethane. The other addition tube was connected to a 50 wt % aqueous sodium hydroxide solution. The mixture was stirred, and over the course of 15 minutes the acid chloride solution and 39.7 g of the sodium hydroxide solution were added simultaneously at constant flow rates to the reactor, corresponding to approximately a 103% stoichiometric ratio of sodium hydroxide to total acid chloride. As this amount of sodium hydroxide added exceeds the stoichiometric amount needed, no further sodium hydroxide was added following completion of the acid chloride addition. The pH at the end of reaction was approximately 9.8. Samples were taken and analyzed after about 10 minutes of stirring, indicating an oligomer Mw of 31,500 (by GPC versus polystyrene standards) and a carboxylic acid end group level of 1384 ppm. This example illustrates that providing a ratio of sodium hydroxide to total acid chloride of 103% of the stoichiometric amount gives a higher Mw and higher acid end group concentration than when a lower ratio is employed. The oligomer may still be acceptable for certain applications.

EXAMPLE 125

Into a two liter cylindrical reactor equipped with a mechanical stirrer, pH electrode, condenser, and two addition tubes connected to metering pumps were charged resorcinol (59.76 g), water (112 g), dichloromethane (741 g), phenol (1.86 g), and triethylamine (1.0 g). One addition tube was connected to an acid chloride solution consisting of 100.3 g of a 50/50 mixture of isophthaloyl dichloride and terephthaloyl dichloride and 186 g of dichloromethane. The other addition tube was connected to a 50 wt % aqueous sodium hydroxide solution. The mixture was stirred, and over the course of 15 minutes the acid chloride solution was added at a constant flow rate to the reactor. The sodium hydroxide solution was not added during the first 30 seconds of the acid chloride addition. After this 30 second delay, 72.6 g of the sodium hydroxide solution was added over the course of the final 14.5 minutes of acid chloride addition, corresponding to approximately a 95% stoichiometric ratio of sodium hydroxide to total acid chloride. Upon completion of the acid chloride addition, a further 6.5g of sodium hydroxide solution was added to the reactor over approximately 2 minutes in order to adjust the pH to approximately 8.2, and the mixture was allowed to stir for about 10 minutes at this pH. Samples were taken and analyzed, indicating an oligomer Mw of 20,200 (by GPC versus polystyrene standards) and a carboxylic acid end group level of 541 ppm. This example illustrates that acceptable product may be obtained when a delay in the sodium hydroxide addition is initially imposed (meaning that essentially a 0% molar ratio of sodium hydroxide to total acid chloride was used at first) followed by a final period of simultaneous sodium hydroxide and acid chloride addition at some positive molar ratio.

EXAMPLE 126

Into a two liter cylindrical reactor equipped with a mechanical stirrer, pH electrode, condenser, and two addition tubes connected to metering pumps were charged resorcinol (72.93 g), water (116 g), dichloromethane (639 g), phenol (2.64 g), and triethylamine (1.2 g). One addition tube was connected to an acid chloride solution consisting of 122 g of a 50/50 mixture of isophthaloyl dichloride and terephthaloyl dichloride and 227 g of dichloromethane. The other addition tube was connected to a 50 wt % aqueous sodium hydroxide solution. The mixture was stirred, and over the course of 15 minutes the acid chloride solution and 91.5 g of the sodium hydroxide solution were added simultaneously at constant flow rates to the reactor, corresponding to approximately a 95% stoichiometric ratio of sodium hydroxide to total acid chloride. After 10.5 minutes of acid chloride addition, a second source of sodium hydroxide solution was introduced to add a further 4.8 g of 50% sodium hydroxide solution over a period of 5 minutes. Thus, the stoichiometric ratio of sodium hydroxide to total acid chloride during the final 4.5 minutes of acid chloride addition was 110%. This resulted in an adjustment of the pH to approximately 7.9, and the mixture was allowed to stir for about 10 minutes at this pH. Samples were taken and analyzed, indicating an oligomer Mw of 18,500 (by GPC versus polystyrene standards) and a carboxylic acid end group level of 840 ppm. This example illustrates that acceptable product may be obtained when the ratio of sodium hydroxide to total acid chloride during simultaneous sodium hydroxide and acid chloride addition is raised near the end of the acid chloride addition.

EXAMPLE 127

Into a one liter, five neck Morton flask equipped with a mechanical stirrer, pH electrode, condenser, and two addition tubes connected to metering pumps were charged resorcinol (29.18 g), water (46 g), dichloromethane (193 ml), phenol (0.95 g), and triethylamine (0.5 g). One addition tube was connected to an acid chloride solution consisting of 48.9 g of a 50/50 mixture of isophthaloyl dichloride and terephthaloyl dichloride and 90.8 g of dichloromethane. The other addition tube was connected to a 50 wt % aqueous sodium hydroxide solution. The mixture was stirred, and the acid chloride solution and sodium hydroxide were added. The acid chloride and sodium hydroxide addition rates were programmed so as to ramp downward continuously over a 15 minute period of simultaneous addition as shown in Table 13.

TABLE 13

| Reactant | Initial flow rate (ml/min) | Final flow rate at 15 min. (ml/min) |
|---|---|---|
| acid chloride | 11.5 | 2.5 |
| sodium hydroxide | 2.65 | 0.58 |

This addition profile resulted in all of the acid chloride solution and 36.6 g (24.2 ml) of the sodium hydroxide solution being added to the reactor at constant 95% ratio of sodium hydroxide to total acid chloride. Upon completion of the acid chloride addition, a further 1.9 g of sodium hydroxide solution was added to the reactor over approximately 2 minutes in order to adjust the pH to approximately 8.0, and the mixture was allowed to stir for about 10 minutes at this pH. Samples were taken and analyzed, indicating an oligomer Mw (by GPC versus polystyrene standards) of 17,100 and a carboxylic acid end group level of 614 ppm. This example illustrates that acceptable product may be obtained when the rates of addition of acid chloride and of sodium hydroxide are programmed to ramp downward from high value at first to a lower value later.

EXAMPLE 128

Into a one liter, five neck Morton flask equipped with a mechanical stirrer, pH electrode, condenser, and two addition tubes connected to metering pumps were charged resorcinol (24.22 g), water (45.5 g), dichloromethane (140 ml), phenol (0.873 g), and triethylamine (0.836 ml). One addition tube was connected to an acid chloride solution consisting of 40.6 g of a 50/50 mixture of isophthaloyl dichloride and terephthaloyl dichloride and 60 ml of dichloromethane. The other addition tube was connected to a 50 wt % aqueous sodium hydroxide solution. The mixture was stirred, and over the course of 15 minutes the acid chloride solution and 30.4 g (95% of stoichiometry based on total acid chloride) of the sodium hydroxide solution were added simultaneously at constant flow rates to the reactor. Upon completion of the acid chloride addition, a further amount of sodium hydroxide solution was added to the reactor over about 3 minutes in order to adjust the pH to approximately 8.25, and the mixture was allowed to stir for about 10 minutes at this pH. Samples were taken and analyzed, indicating an oligomer Mw (by GPC versus polystyrene standards) of 18,800 and a carboxylic acid end group level of 647 ppm. This example illustrates that acceptable product may be obtained using a 15 minute addition time of acid chloride and of sodium hydroxide.

EXAMPLE 129

Into a thirty liter round bottom reactor equipped with a mechanical stirrer, pH electrode, condenser, and two addition tubes connected to metering pumps were charged resorcinol (848 g), water (1.3 liters), dichloromethane (9 liters), phenol (30.3 g), and triethylamine (29 ml). One addition tube was connected to an acid chloride solution consisting of 1422 g of a 50/50 mixture of isophthaloyl dichloride and terephthaloyl dichloride and 2 liters of dichloromethane. The other addition tube was connected to a 50 wt % aqueous sodium hydroxide solution. The mixture was stirred, and over the course of 10 minutes the acid chloride solution and 1065 g (95% of stoichiometry based on total acid chloride) of the sodium hydroxide solution were added simultaneously at constant flow rates to the reactor. Upon completion of the acid chloride addition, a further amount of sodium hydroxide solution was added to the reactor over about 3 minutes in order to adjust the pH to approximately 8.25, and the mixture was allowed to stir for about 10 minutes at this pH. Samples were taken and analyzed, indicating an oligomer Mw (by GPC versus polystyrene standards) of 18,600 and a carboxylic acid end group level of 621 ppm. This example illustrates that acceptable product may be obtained using a 10 minute addition time of acid chloride and of sodium hydroxide.

EXAMPLE 130

The conditions of Example 129 were repeated except that the acid chloride and sodium hydroxide solutions were added over a period of 7 minutes rather than 10. Samples were taken and analyzed, indicating an oligomer Mw (by GPC versus polystyrene standards) of 19,800 and a carboxylic acid end group level of 886 ppm. This example illustrates that acceptable product may be obtained using a 7 minute addition time of acid chloride and of sodium hydroxide.

EXAMPLE 131

The conditions of Example 129 was repeated except that the acid chloride and sodium hydroxide solutions were added over a period of 5 minutes. Samples were taken and analyzed, indicating an oligomer Mw (by GPC versus polystyrene standards) of 21,200 and a carboxylic acid end group level of 1040 ppm. This example illustrates that using a 5 minute addition time of acid chloride and of sodium hydroxide gives a higher Mw and higher acid end group concentration compared to longer addition times. The oligomer is still be acceptable for certain applications.

EXAMPLE 132

Into a one liter, five neck Morton round bottom flask equipped with a mechanical stirrer, pH electrode, condenser, and two addition tubes connected to metering pumps were charged resorcinol (29.18 g), water (46 g), dichloromethane (256 g), and triethylamine (0.5 g). One addition tube was connected to an acid chloride solution consisting of 48.9 g of a 50/50 mixture of isophthaloyl dichloride and terephthaloyl dichloride and 90.8 g of dichloromethane. The other addition tube was connected to a 50 wt % aqueous sodium hydroxide solution. The mixture was stirred, and over the course of 15 minutes the acid chloride solution and 36.6 g of the sodium hydroxide solution were added simultaneously at constant flow rates to the reactor, corresponding to approximately a 95% stoichiometric ratio of sodium hydroxide to total acid chloride. At the 10 minute point, 0.95 g of phenol was added. Upon completion of the acid chloride addition, a further 1.9 g of sodium hydroxide solution was added to the reactor over approximately 2 minutes in order to adjust the pH to approximately 7.8, and the mixture was allowed to stir for about 10 minutes at this pH. Samples were taken and analyzed, indicating an oligomer Mw of 24,300 (by GPC versus polystyrene standards) and a carboxylic acid end group level of 834 ppm. This example illustrates that acceptable product may be obtained when no phenol is added initially, but instead is all added at the 10 minute point of the sodium hydroxide/acid chloride 15 minute addition process.

EXAMPLE 133

The conditions of Example 132 were repeated except that the 0.95 g of phenol was added at the 13 minute point, 2 minutes before the end of the acid chloride addition. Samples were taken and analyzed, indicating an oligomer Mw of 22,200 (by GPC versus polystyrene standards) and a carboxylic acid end group level of 917 ppm. This example illustrates that acceptable product may be obtained when no phenol is added initially, but instead is all added at the 13 minute point of the sodium hydroxide/acid chloride 15 minute addition process.

EXAMPLE 134

The conditions of Examples 132 was repeated except that the 0.95 g of phenol was predissolved in the same solution as the acid chlorides, meaning that the phenol was added continuously over the 15 minute period. Samples were taken and analyzed, indicating an oligomer Mw of 26,700 (by GPC versus polystyrene standards) and a carboxylic acid end group level of 950 ppm. This example illustrates that acceptable product may be obtained when phenol is added continuously over the entire period of the sodium hydroxide/acid chloride addition time.

EXAMPLE 135

Into a thirty liter round bottom reactor equipped with a mechanical stirrer, pH electrode, condenser, and two addition tubes connected to metering pumps were charged resorcinol (727 g), water (1.16 liters), dichloromethane (9.3 liters), phenol (25.2 g), and triethylamine (17 ml). One addition tube was connected to an acid chloride solution consisting of 1218 g of a 50/50 mixture of isophthaloyl dichloride and terephthaloyl dichloride and 1.5 liters of dichloromethane. The other addition tube was connected to a 50 wt % aqueous sodium hydroxide solution. The mixture was stirred, and over the course of 15 minutes the acid chloride solution and 602 ml (95% of stoichiometry based on acid chloride) of the sodium hydroxide solution were added simultaneously at constant flow rates to the reactor. Upon completion of the acid chloride addition, a further amount of sodium hydroxide solution was added to the reactor over about 3 minutes in order to adjust the pH to approximately 8.25, and the mixture was allowed to stir for about 10 minutes at this pH. Samples were taken and analyzed, indicating an oligomer Mw (by GPC versus polystyrene standards) of 22,000 and a carboxylic acid end group level of 627 ppm. This example illustrates that acceptable product may be obtained when total acid chloride is added as a solution in organic solvent.

EXAMPLE 136

The conditions of Example 135 were repeated except that the acid chloride was added to the reactor in a molten state (at approximately 90–110° C.) rather than as a solution and dichloromethane that would normally have been added as a solution with a acid chloride was not added. Samples were taken and analyzed, indicating an oligomer Mw (by GPC versus polystyrene standards) of 21,600 and a carboxylic acid end group level of 630 ppm. This example illustrates that acceptable product may be obtained when total acid chloride is added in molten form.

EXAMPLE 137

Into a one liter, 5 neck Morton flask equipped with a mechanical stirrer, pH electrode, condenser, and two addition tubes connected to metering pumps were charged resorcinol (23.67 g), water (50 g), dichloromethane (140 ml), phenol (0.873 g), and triethylamine (0.56 ml). One addition tube was connected to an acid chloride solution consisting of 40.6 g of a 50/50 mixture of isophthaloyl dichloride and terephthaloyl dichloride and 60 ml of dichloromethane. The other addition tube was connected to a 50 wt % aqueous sodium hydroxide solution. The mixture was stirred, and over the course of 15 minutes the acid chloride solution and 30.1 g (94% of stoichiometry based on total acid chloride) of the sodium hydroxide solution were added simultaneously at constant flow rates to the reactor. Upon completion of the acid chloride addition, a further amount of sodium hydroxide solution was added to the reactor over about 3 minutes in order to adjust the pH to approximately 8.0, and the mixture was allowed to stir for about 10 minutes at this pH. Samples were taken and analyzed, indicating an oligomer Mw (by GPC versus polystyrene standards) of 21,700 and a carboxylic acid end group level of 528 ppm.

EXAMPLE 138

The conditions of Example 137 were repeated except that the pH was adjusted to about 6.0 (rather than about 8.0) at the end of the acid chloride addition. Samples were taken and analyzed, indicating an oligomer Mw (by GPC versus polystyrene standards) of 22,700 and a carboxylic acid end group level of 178 ppm. This example illustrates that acceptable product may be obtained when the final pH is adjusted to 6.0.

COMPARATIVE EXAMPLE 139

The conditions of Example 137 were repeated except that the pH was adjusted to about 10.0 (rather than about 8.0) at the end of the acid chloride addition. Samples were taken and analyzed, indicating an oligomer Mw (by GPC versus polystyrene standards) of 22,300 and a carboxylic acid end group level of 5304 ppm. This example illustrates that product with unacceptable level of carboxylic end group may be obtained when the final pH is adjusted to 10.0.

EXAMPLE 140

Into a two liter cylindrical reactor-equipped with a mechanical stirrer, pH electrode, condenser, and two addition tubes connected to metering-pumps were charged resorcinol (72.93 g), water (116 g), dichloromethane (639 g), phenol (2.64 g), and triethylamine (1.2 g). One addition tube was connected to an acid chloride solution consisting of 122 g of a 50/50 mixture of isophthaloyl dichloride and terephthaloyl dichloride and 227 g of dichloromethane. The other addition tube was connected to a 50 wt % aqueous sodium hydroxide solution. The mixture was stirred, and over the course of 15 minutes the acid chloride solution and 91.5 g of the sodium hydroxide solution were added simultaneously at constant flow rates to the reactor, corresponding to approximately a 95% stoichiometric ratio of sodium hydroxide to total acid chloride. Upon completion of the acid chloride addition, a further amount of sodium hydroxide solution was added to the reactor over approximately 3 minutes in order to adjust the pH to approximately 7.78, and the mixture was allowed to stir for about 10 minutes at this pH. Samples were taken and analyzed, indicating an oligomer Mw of 18,700 (by GPC versus polystyrene standards) and a carboxylic acid end group level of 526 ppm. This example illustrates that acceptable product may be obtained when the final pH is adjusted to about 7.8.

EXAMPLE 141

The conditions of Example 140 were repeated except that the pH was adjusted to approximately 8.85 at the end of the acid chloride addition. Samples were taken and analyzed, indicating an oligomer Mw (by GPC versus polystyrene standards) of 20,300 and a carboxylic acid end group level of 828 ppm. This example illustrates that acceptable product may be obtained when the final pH is adjusted to about 8.9.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents and U.S. Pat. applications cited herein are incorporated herein by reference.

What is claimed is:

1. An interfacial method for preparing polymers comprising chain members derived from at least one 1,3-dihydroxybenzene moiety and at least one aromatic dicarboxylic acid moiety, said polymer being substantially free of anhydride linkages linking at least two mers of the polymer chain, comprising the steps of:
   (a) combining at least one 1,3-dihydroxybenzene moiety and at least one catalyst in a mixture of water and at least one organic solvent substantially immiscible with water;
   (b) adding to the mixture from (a) a controlled stoichiometric ratio of at least one acid chloride and at least one base while maintaining the pH between about 4 and about 8.5, and
   (c) adjusting the pH of the reaction mixture to a value in the range of about 7 and about 9 following complete addition of acid chloride, and stirring the reaction mixture for a time sufficient to destroy any anhydride linkages in the polymer chain.

2. The method of claim 1 wherein the 1,3-dihydroxybenzene moiety is at least one member selected from the group consisting of compounds of the formula:

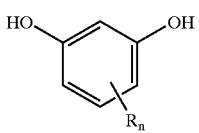

wherein R is at least one of $C_{1-12}$ alkyl or halogen, and n is 0–3.

3. The method of claim 2 wherein the 1,3-dihydroxybenzene moiety is selected from the group consisting of unsubstituted resorcinol, 2-methyl resorcinol, and mixtures thereof.

4. The method of claim 3 wherein the 1,3-dihydroxybenzene moiety is unsubstituted resorcinol.

5. The method of claim 1 wherein the catalyst is selected from the group consisting of tertiary amines, quaternary ammonium salts, quaternary phosphonium salts, hexaalkylguanidinium salts, and mixtures thereof.

6. The method of claim 5 wherein the catalyst is selected from the group consisting of triethylamine, dimethylbutylamine, N-ethylpiperidine, N-methylpiperidine, diisopropylethylamine, 2,2,6,6-tetramethylpiperidine, tetrapropylammonium bromide, tetrabutylammonium bromide, tetrabutylammonium chloride, methyltributylammonium chloride, benzyltriethylammonium chloride, cetyltrimethylammonium bromide, tetrabutylphosphonium bromide, hexaethylguanidinium chloride, and mixtures thereof.

7. The method of claim 5 wherein the catalyst is at least one tertiary amine.

8. The method of claim 1 wherein the organic solvent is selected from the group consisting of chloroform, chlorobenzene, dichloromethane, 1,2-dichloroethane, dichlorobenzene, toluene, xylene, trimethylbenzene, and mixtures thereof.

9. The method of claim 1 wherein the acid chloride comprises at least one aromatic dicarboxylic acid dichloride.

10. The method of claim 9 wherein the aromatic dicarboxylic acid dichloride is selected from the group consisting of isophthaloyl dichloride, terephthaloyl dichloride, naphthalene-2,6-dicarboxylic acid dichloride, and mixtures thereof.

11. The method of claim 10 further comprising at least one aliphatic dicarboxylic acid dichloride.

12. The method of claim 11 wherein the aliphatic dicarboxylic acid dichloride is selected from the group consisting of sebacoyl chloride and cyclohexane-1,4-dicarboxylic acid dichloride.

13. The method of claim 10 wherein the dicarboxylic acid dichloride is a mixture of isophthaloyl dichloride and terephthaloyl dichloride.

14. The method of claim 13 wherein the ratio of isophthaloyl dichloride to terephthaloyl dichloride is about 0.25–4.0:1.

15. The method of claim 13 wherein the ratio of isophthaloyl dichloride to terephthaloyl dichloride is about 0.67–1.5:1.

16. The method of claim 1 wherein the stoichiometric ratio of total phenolic groups to total acid chloride groups is in a range of between about 1.9:1 and about 1.01:1.

17. The method of claim 16 wherein the stoichiometric ratio of total phenolic groups to total acid chloride groups is in a range of between about 1.25:1 and about 1.01:1.

18. The method of claim 1 wherein the base is at least one of an alkali metal hydroxide, an alkaline earth hydroxide, or an alkaline earth oxide.

19. The method of claim 18 wherein the base is aqueous sodium hydroxide.

20. The method of claim 1 further comprising at least one chain-stopper selected from the group consisting of monophenolic compounds, mono-carboxylic acid chlorides, mono-chloroformates, and mixtures thereof.

21. The method of claim 20 wherein the chain-stopper is at least one member selected from the group consisting of phenol, alkyl-substituted phenol, p-cumylphenol, p-tertiary-butyl phenol, diphenol monoester, resorcinol monobenzoate, diphenol monoether, p-methoxyphenol, benzoyl chloride, alkyl-substituted benzoyl chloride, toluoyl chloride, halogen-substituted benzoyl chloride, bromobenzoyl chloride, trimellitic anhydride chloride, cinnamoyl chloride, 4-nadimidobenzoyl chloride, phenyl chloroformate, alkyl-substituted phenyl chloroformate, p-cumyl phenyl chloroformate, toluene chloroformate, and mixtures thereof.

22. The method of claim 20 wherein all of the chain-stopper is present in the reaction mixture before addition of acid chloride.

23. The method of claim 20 wherein at least a portion of the chain-stopper is present in the reaction mixture before addition of acid chloride.

24. The method of claim 20 wherein at least a portion of the chain-stopper is added to the reaction mixture during or after addition of acid chloride.

25. The method of claim 24 wherein at least a portion of the chain-stopper is added either continuously, or in more than one step, or in one step to the reaction mixture during addition of acid chloride.

26. The method of claim 25 wherein the chain-stopper is phenol.

27. The method of claim 20 wherein all of the chain-stopper is added to the reaction mixture during or after addition of acid chloride.

28. The method of claim 27 wherein all of the chain-stopper is added either continuously, or in more than one step, or in one step to the reaction mixture during addition of acid chloride.

29. The method of claim 28 wherein the chain-stopper is phenol.

30. The method of claim 1 wherein the stoichiometric ratio of base to acid chloride is held at a constant value during the addition process.

31. The method of claim 30 wherein the stoichiometric ratio of base to acid chloride is held at a constant value in a range of between about 85% and about 105% during the addition process.

32. The method of claim 30 wherein the stoichiometric ratio of base to acid chloride is held at a constant value in a range of between about 90% and about 99% during the addition process.

33. The method of claim 1 wherein the stoichiometric ratio of base to acid chloride is varied during the addition process.

34. The method of claim 33 wherein the stoichiometric ratio of base to acid chloride is varied during the addition process in a range of between about 0% and about 125%.

35. The method of claim 34 wherein there is a delay time between start of acid chloride addition and the start of base addition.

36. The method of claim 33 wherein the stoichiometric ratio of base to acid chloride is varied during the addition process in a range of between about 85% and about 110%.

37. The method of claim 1 wherein the addition rates of base and of acid chloride are held at constant values during the addition process.

38. The method of claim 1 wherein the addition rate of either base or acid chloride, or of both base and acid chloride are varied during the addition process.

39. The method of claim 1 wherein the polymer has a weight average molecular weight of at least about 900 compared to polystyrene standards and a phenolic end-group concentration in a range of between about 2 ppm and about 37,000 ppm.

40. The method of claim 1 wherein the molecular weight of said polymer decreases by less than 30% upon heating said polymer at a temperature of about 280–290° C. for five minutes.

41. The method of claim 1 wherein the molecular weight of said polymer decreases by less than 10% upon heating at a temperature of about 280–290° C. for five minutes.

42. An interfacial method for preparing a polymer consisting essentially of chain members derived from a mixture of terephthaloyl dichloride and isophthaloyl dichloride in a molar ratio in a range of about 0.4–2.5:1 and unsubstituted resorcinol, said polymer being substantially free of anhydride linkages linking at least two mers of the polymer chain, comprising the steps of:
(a) combining unsubstituted resorcinol, at least one mono-phenolic chain-stopper, and at least one tertiary amine catalyst in a mixture of water and dichloromethane;
(b) adding to the mixture from (a) a controlled stoichiometric ratio of acid chlorides and aqueous sodium hydroxide while maintaining the pH between about 4 and about 8.5, wherein the stoichiometric ratio of sodium hydroxide to acid chlorides is held at a constant value in a range between about 90% and about 99% during addition or is varied in a range of between 0% and 125% during addition, and wherein the total molar amount of acid chloride groups is stoichiometrically deficient relative to the total molar amount of phenolic groups; and
(c) adjusting the pH of the reaction mixture to a value in the range of about 7 and about 9 following complete addition of acid chlorides, and stirring the reaction mixture for a time sufficient to destroy any anhydride linkages in the polymer chain;
wherein the polymer has a weight average molecular weight of at least about 900 compared to polystyrene standards and a phenolic end-group concentration in a range of between about 2 ppm and about 37,000 ppm.

43. The method of claim 42 wherein the molecular weight of said polymer decreases by less than 30% upon heating said polymer at a temperature of about 280–290° C. for five minutes.

44. The method of claim 42 wherein the molecular weight of said polymer decreases by less than 10% upon heating at a temperature of about 280–290° C. for five minutes.

45. A hydroxy-terminated polyester comprising chain members derived from a mixture of terephthaloyl dichloride and isophthaloyl dichloride in a molar ratio in a range of about 0.4–2.5:1 and unsubstituted resorcinol, said polymer being substantially free of anhydride linkages linking at least two mers of the polymer chain, the polymer being made by the steps of:
(a) combining unsubstituted resorcinol, at least one mono-phenolic chain-stopper, and at least one tertiary amine catalyst in a mixture of water and dichloromethane;
(b) adding to the mixture from (a) a controlled stoichiometric ratio of acid chlorides and aqueous sodium hydroxide while maintaining the pH between about 4 and about 8.5, wherein the stoichiometric ratio of sodium hydroxide to acid chlorides is held at a constant value in a range between about 90% and about 99% during addition or is varied in a range of between 0% and 125% during addition, and wherein the total molar amount of acid chloride groups is stoichiometrically deficient relative to the total molar amount of phenolic groups; and
(c) adjusting the pH of the reaction mixture to a value in the range of about 7 and about 9 following complete addition of acid chlorides, and stirring the reaction mixture for a time sufficient to destroy any anhydride linkages in the polymer chain;
wherein the polyester has a weight average molecular weight of at least about 900 compared to polystyrene standards and a phenolic end-group concentration in a range of between about 2 ppm and about 37,000 ppm.

46. The polyester of claim 45 wherein the weight average molecular weight of said polymer is in a range of between 4,000 to about 40,000 compared to polystyrene standards.

47. The polyester of claim 45 wherein the weight average molecular weight of said polymer is in a range of between 10,000 to about 30,000 compared to polystyrene standards.

48. The polyester of claim 45 wherein the weight average molecular weight of said polymer is in a range of between 16,000 to about 25,000 compared to polystyrene standards.

49. The polyester of claim 45 having less than about 1800 ppm carboxylic acid end-groups.

50. The polyester of claim 45 having carboxylic acid end-groups in a range of between about 300 ppm and about 1500 ppm.

51. An interfacial method for preparing a copolymer comprising $C_{3-20}$ straight chain alkylene, $C_{3-10}$ branched alkylene, or $C_{4-10}$ cyclo- or bicyclo-alkylene chain members derived from at least one dicarboxylic acid dichloride, in combination with chain members derived from at least one aromatic dicarboxylic acid dichloride and unsubstituted resorcinol, said polymer being substantially free of anhydride linkages linking at least two mers of the polymer chain, comprising the steps of:

(a) combining unsubstituted resorcinol, at least one monophenolic chain-stopper, and at least one tertiary amine catalyst in a mixture of water and dichloromethane;

(b) adding to the mixture from (a) a controlled stoichiometric ratio of acid chlorides and aqueous sodium hydroxide while maintaining the pH between about 4 and about 8.5, wherein the stoichiometric ratio of sodium hydroxide to acid chlorides is held at a constant value in a range between about 90% and about 99% during addition or is varied in a range of between 0% and 125% during addition, and wherein the total molar amount of acid chloride groups is stoichiometrically deficient relative to the total molar amount of phenolic groups; and (c) adjusting the pH of the reaction mixture to a value in the range of about 7 and about 9 following complete addition of acid chlorides, and stirring the reaction mixture for a time sufficient to destroy any anhydride linkages in the polymer chain;

wherein the molecular weight of said copolymer decreases by less than 30% upon heating said polymer at a temperature of about 280–290° C. for five minutes.

52. The method of claim 51 wherein the molecular weight of said polymer decreases by less than 10% upon heating at a temperature of about 280–290° C. for five minutes.

53. The method of claim 51 wherein the dicarboxylic acid dichlorides are at least two members selected from the group consisting of isophthaloyl dichloride, terephthaloyl dichloride, naphthalene-2,6-dicarboxylic acid dichloride, sebacoyl chloride, and cyclohexane-1,4-dicarboxylic acid dichloride.

54. The method of claim 53 wherein the dicarboxylic acid dichlorides are a mixture of isophthaloyl dichloride and sebacoyl chloride.

55. The method of claim 54 wherein the copolymer comprises from about 1 to about 45 mole % sebacate chain members.

56. A hydroxy-terminated polyester comprising $C_{3-20}$ straight chain alkylene, $C_{3-10}$ branched alkylene, or $C_{4-10}$ cyclo- or bicyclo-alkylene chain members derived from at least one dicarboxylic acid dichloride, in combination with chain members derived from at least one aromatic dicarboxylic acid dichloride and unsubstituted resorcinol, said polymer being substantially free of anhydride linkages linking at least two mers of the polymer chain the polymer being made by the steps of:

(a) combining unsubstituted resorcinol, at least one monophenolic chain-stopper, and at least one tertiary amine catalyst in a mixture of water and dichloromethane;

(b) adding to the mixture from (a) a controlled stoichiometric ratio of acid chlorides and aqueous sodium hydroxide while maintaining the pH between about 4 and about 8.5, wherein the stoichiometric ratio of sodium hydroxide to acid chlorides is held at a constant value in a range between about 90% and about 99% during addition or is varied in a range of between 0% and 125% during addition, and wherein the total molar amount of acid chloride groups is stoichiometrically deficient relative to the total molar amount of phenolic groups; and (c) adjusting the pH of the reaction mixture to a value in the range of about 7 and about 9 following complete addition of acid chlorides, and stirring the reaction mixture for a time sufficient to destroy any anhydride linkages in the polymer chain.

57. The polyester of claim 56 wherein the dicarboxylic acid dichlorides are at least two members selected from the group consisting of isophthaloyl dichloride, terephthaloyl dichloride, naphthalene-2,6-dicarboxylic acid dichloride, sebacoyl chloride, and cyclohexane-1,4-dicarboxylic acid dichloride.

58. The polyester of claim 57 wherein the dicarboxylic acid dichlorides are a mixture of isophthaloyl dichloride and sebacoyl chloride.

59. The polyester of claim 58 wherein the copolymer comprises from about 1 to about 45 mole % sebacate chain members.

60. The polyester of claim 56 wherein the weight average molecular weight of said polymer is in a range of between 4,000 to about 40,000 compared to polystyrene standards.

61. The polyester of claim 56 wherein the weight average molecular weight of said polymer is in a range of between 10,000 to about 30,000 compared to polystyrene standards.

62. The polyester of claim 56 wherein the weight average molecular weight of said polymer is in a range of between 16,000 to about 25,000 compared to polystyrene standards.

63. The polyester of claim 56 having less than about 1800 ppm carboxylic acid end-groups.

64. The polyester of claim 56 having carboxylic acid end-groups in a range of between about 300 ppm and about 1500 ppm.

65. An interfacial method for preparing a block copolyestercarbonate comprising polyester block segments with chain members derived from at least one 1,3-dihydroxybenzene moiety and at least one aromatic dicarboxylic acid moiety; and polycarbonate block segments; wherein said copolyestercarbonate is substantially free of anhydride linkages linking at least two mers of the polyester blocks, comprising the steps of:

(a) combining at least one 1,3-dihydroxybenzene moiety and at least one catalyst in a mixture of water and at least one organic solvent substantially immiscible with water;

(b) adding to the mixture from (a) a controlled stoichiometric ratio of at least one acid chloride and at least one base while maintaining the pH between about 4 and about 8.5;

(c) adjusting the pH of the reaction mixture to a value in the range of about 7 and about 9 following complete addition of acid chloride, and stirring the reaction mixture for a time sufficient to destroy any anhydride linkages in the polyester intermediate chain; wherein the polyester intermediate has a weight average molecular weight of at least about 900 compared to polystyrene standards and a phenolic end-group concentration in a range of between about 2 ppm and about 37,000 ppm; and (d) conducting a reaction of said polyester intermediate with a carbonate precursor in the presence of at least one organic dihydroxy compound different from the hydroxy-terminated polyester intermediate to form copolyestercarbonate.

66. The method of claim 65 wherein the 1,3-dihydroxybenzene moiety is at least one member selected from the group consisting of compounds of the formula:

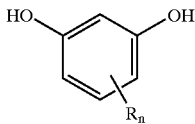

wherein R is at least one of $C_{1-12}$ alkyl or halogen, and n is 0–3.

67. The method of claim 65 wherein the 1,3-dihydroxybenzene moiety is selected from the group consisting of unsubstituted resorcinol, 2-methyl resorcinol, and mixtures thereof.

68. The method of claim 67 wherein the 1,3-dihydroxybenzene moiety is unsubstituted resorcinol.

69. The method of claim 65 wherein the catalyst is selected from the group consisting of tertiary amines, quaternary ammonium salts, quaternary phosphonium salts, hexaalkylguanidinium salts, and mixtures thereof.

70. The method of claim 69 wherein the catalyst is selected from the group consisting of triethylamine, dimethylbutylamine, N-ethylpiperidine, N-methylpiperidine, diisopropylethylamine, 2,2,6,6-tetramethylpiperidine, tetrapropylammonium bromide, tetrabutylammonium bromide, tetrabutylammonium chloride, methyltributylammonium chloride, benzyltriethylammonium chloride, cetyltrimethylammonium bromide, tetrabutylphosphonium bromide, hexaethylguanidinium chloride, and mixtures thereof.

71. The method of claim 69 wherein the catalyst is at least one tertiary amine.

72. The method of claim 65 wherein the organic solvent is selected from the group consisting of chloroform, chlorobenzene, dichloromethane, 1,2-dichloroethane, dichlorobenzene, toluene, xylene, trimethylbenzene, and mixtures thereof.

73. The method of claim 65 wherein the acid chloride comprises at least one aromatic dicarboxylic acid dichloride.

74. The method of claim 73 wherein the aromatic dicarboxylic acid dichloride is selected from the group consisting of isophthaloyl dichloride, terephthaloyl dichloride, naphthalene-2,6-dicarboxylic acid dichloride, and mixtures thereof.

75. The method of claim 74 further comprising at least one aliphatic dicarboxylic acid dichloride.

76. The method of claim 75 wherein the aliphatic dicarboxylic acid dichloride is selected from the group consisting of sebacoyl chloride and cyclohexane-1,4-dicarboxylic acid dichloride.

77. The method of claim 74 wherein the dicarboxylic acid dichloride is a mixture of isophthaloyl dichloride and terephthaloyl dichloride.

78. The method of claim 77 wherein the ratio of isophthaloyl dichloride to terephthaloyl dichloride is about 0.25–4.0:1.

79. The method of claim 77 wherein the ratio of isophthaloyl dichloride to terephthaloyl dichloride is about 0.67–1.5:1.

80. The method of claim 65 wherein the stoichiometric ratio of total phenolic groups to total acid chloride groups is in a range of between about 1.9:1 and about 1.01:1.

81. The method of claim 80 wherein the stoichiometric ratio of total phenolic groups to total acid chloride groups is in a range of between about 1.25:1 and about 1.01:1.

82. The method of claim 65 wherein the base is at least one of an alkali metal hydroxide, an alkaline earth hydroxide, or an alkaline earth oxide.

83. The method of claim 82 wherein the base is aqueous sodium hydroxide.

84. The method of claim 65 further comprising in the synthesis of polyester block segments at least one chain-stopper selected from the group consisting of mono-phenolic compounds, mono-carboxylic acid chlorides, mono-chloroformates, and mixtures thereof.

85. The method of claim 84 wherein the chain-stopper is at least one member selected from the group consisting of phenol, alkyl-substituted phenol, p-cumylphenol, p-tertiary-butyl phenol, diphenol monoester, resorcinol monobenzoate, diphenol monoether, p-methoxyphenol, benzoyl chloride, alkyl-substituted benzoyl chloride, toluoyl chloride, halogen-substituted benzoyl chloride, bromobenzoyl chloride, trimellitic anhydride chloride, cinnamoyl chloride, 4-nadimidobenzoyl chloride, phenyl chloroformate, alkyl-substituted phenyl chloroformate, p-cumyl phenyl chloroformate, toluene chloroformate, and mixtures thereof.

86. The method of claim 84 wherein all of the chain-stopper is present in the reaction mixture before addition of acid chloride.

87. The method of claim 84 wherein at least a portion of the chain-stopper is present in the reaction mixture before addition of acid chloride.

88. The method of claim 84 wherein at least a portion of the chain-stopper is added to the reaction mixture during or after addition of acid chloride.

89. The method of claim 88 wherein at least a portion of the chain-stopper is added either continuously, or in more than one step, or in one step to the reaction mixture during addition of acid chloride.

90. The method of claim 89 wherein the chain-stopper is phenol.

91. The method of claim 84 wherein all of the chain-stopper is added to the reaction mixture during or after addition of acid chloride.

92. The method of claim 91 wherein all of the chain-stopper is added either continuously, or in more than one step, or in one step to the reaction mixture during addition of acid chloride.

93. The method of claim 92 wherein the chain-stopper is phenol.

94. The method of claim 65 wherein the stoichiometric ratio of base to acid chloride is held at a constant value during the addition process.

95. The method of claim 94 wherein the stoichiometric ratio of base to acid chloride is held at a constant value in a range of between about 85% and about 105% during the addition process.

96. The method of claim 94 wherein the stoichiometric ratio of base to acid chloride is held at a constant value in a range of between about 90% and about 99% during the addition process.

97. The method of claim 65 wherein the stoichiometric ratio of base to acid chloride is varied during the addition process.

98. The method of claim 97 wherein the stoichiometric ratio of base to acid chloride is varied during the addition process in a range of between about 0% and about 125%.

99. The method of claim 98 wherein there is a delay time between start of acid chloride addition and the start of base addition.

100. The method of claim 97 wherein the stoichiometric ratio of base to acid chloride is varied during the addition process in a range of between about 85% and about 110%.

101. The method of claim 65 wherein the addition rates of base and of acid chloride are held at a constant value during the addition process.

102. The method of claim 65 wherein the addition rate of either base or acid chloride, or of both base and acid chloride are varied during the addition process.

103. The method of claim 65 wherein the polyester intermediate has a weight average molecular weight of at least about 900 compared to polystyrene standards and a phenolic end-group concentration in a range of between about 2 ppm and about 37,000 ppm.

104. The method of claim 65 wherein the molecular weight of the polyester intermediate decreases by less than 30% upon heating said polymer at a temperature of about 280–290° C. for five minutes.

105. The method of claim 65 wherein the molecular weight of the polyester intermediate decreases by less than 10% upon heating at a temperature of about 280–290° C. for five minutes.

106. The method of claim 65 wherein the polyester intermediate is not isolated from solution before conducting a reaction of said polyester intermediate with a carbonate precursor.

107. The method of claim 65 wherein at least one organic dihydroxy compound different from the hydroxy-terminated polyester intermediate is the same as at least one 1,3-dihydroxybenzene moiety employed in the synthesis of polyester intermediate.

108. The method of claim 107 wherein the organic dihydroxy compound is unsubstituted resorcinol.

109. The method of claim 65 wherein at least one organic dihydroxy compound is different from any 1,3-dihydroxybenzene moiety employed in the synthesis of polyester intermediate.

110. The method of claim 109 wherein the at least one organic dihydroxy compound is bisphenol A.

111. The method of claim 65 wherein at least one polycarbonate is prepared in the presence of or simultaneously with the copolyestercarbonate.

112. The method of claim 111 wherein the organic dihydroxy compound is bisphenol A.

113. The method of claim 65 wherein the reaction of said polyester intermediate with a carbonate precursor is conducted in the presence of a mixture of organic dihydroxy compounds, at least one of which is the same as and at least one of which is different from any 1,3-dihydroxybenzene moiety employed in polyester intermediate synthesis.

114. The method of claim 113 wherein the mixture of organic dihydroxy compounds consists of unsubstituted resorcinol and bisphenol A.

115. The method of claim 65 wherein the carbonate precursor is phosgene.

116. The method of claim 65 wherein polyester intermediate synthesis and copolyestercarbonate synthesis are both conducted in a two-phase system including an aqueous phase and a water-immiscible organic solvent.

117. An interfacial method for preparing a block copolyestercarbonate comprising polyester block segments with chain members derived from a mixture of terephthaloyl dichloride and isophthaloyl dichloride in a molar ratio in a range of about 0.4–2.5:1 and unsubstituted resorcinol, and polycarbonate segments with chain members derived from at least one of unsubstituted resorcinol and bisphenol A;

wherein said copolyestercarbonate is substantially free of anhydride linkages linking at least two mers of the polyester blocks, comprising the steps of:
(a) combining unsubstituted resorcinol, at least one mono-phenolic chain-stopper, and at least one tertiary amine catalyst in a mixture of water and dichloromethane;
(b) adding to the mixture from (a) a controlled stoichiometric ratio of acid chlorides and aqueous sodium hydroxide while maintaining the pH between about 4 and about 8.5, wherein the stoichiometric ratio of sodium hydroxide to acid chlorides is held at a constant value in a range between about 90% and about 99% during addition or is varied in a range of between 0% and 125% during addition, and wherein the total molar amount of acid chloride groups is stoichiometrically deficient relative to the total molar amount of phenolic groups;
(c) adjusting the pH of the reaction mixture to a value in the range of about 7 and about 9 following complete addition of acid chlorides, and stirring the reaction mixture for a time sufficient to destroy any anhydride linkages in the polyester intermediate chain; wherein the polyester intermediate has a weight average molecular weight of at least about 900 compared to polystyrene standards and a phenolic end-group concentration in a range of between about 2 ppm and about 37,000 ppm; and
(d) conducting a reaction of said polyester intermediate with phosgene in a mixture comprising water and dichloromethane in the presence of bisphenol A to form copolyestercarbonate.

118. The method of claim 117 wherein the copolyestercarbonate is recovered from the reaction mixture.

* * * * *